(12) United States Patent
Arndt et al.

(10) Patent No.: US 12,458,056 B2
(45) Date of Patent: Nov. 4, 2025

(54) DILL-CONTAINING AEROSOL-GENERATING SUBSTRATE

(71) Applicant: Philip Morris Products S.A., Neuchatel (CH)

(72) Inventors: Daniel Arndt, Bellmund (CH); Prisca Campanoni, Villars-Burquin (CH); Jean-Pierre Schaller, Geneva (CH)

(73) Assignee: Philip Morris Products S.A., Neuchatel (CH)

( * ) Notice: Subject to any disclaimer, the term of this patent is extended or adjusted under 35 U.S.C. 154(b) by 385 days.

(21) Appl. No.: 18/003,370

(22) PCT Filed: Jun. 28, 2021

(86) PCT No.: PCT/EP2021/067741
§ 371 (c)(1),
(2) Date: Dec. 27, 2022

(87) PCT Pub. No.: WO2022/002875
PCT Pub. Date: Jan. 6, 2022

(65) Prior Publication Data
US 2023/0146464 A1    May 11, 2023

(30) Foreign Application Priority Data
Jun. 30, 2020    (EP) .................................... 20183160

(51) Int. Cl.
*A24F 40/20*    (2020.01)
*A24B 3/14*    (2006.01)
(Continued)

(52) U.S. Cl.
CPC .............. *A24B 15/167* (2016.11); *A24B 3/14* (2013.01); *A24B 15/14* (2013.01); *A24B 15/302* (2013.01); *A24D 1/20* (2020.01)

(58) Field of Classification Search
None
See application file for complete search history.

(56) References Cited

U.S. PATENT DOCUMENTS

| 3,860,012 A | 1/1975 | Selke |
|---|---|---|
| 3,894,544 A | 7/1975 | Egri |

(Continued)

FOREIGN PATENT DOCUMENTS

| CN | 104479867 A | 4/2015 |
|---|---|---|
| EA | 012316 B1 | 8/2009 |

(Continued)

OTHER PUBLICATIONS

Translation of WO 2020/013339 (Year: 2020).*
(Continued)

*Primary Examiner* — Cynthia Szewczyk
(74) *Attorney, Agent, or Firm* — Oblon, McClelland, Maier & Neustadt, L.L.P.

(57) ABSTRACT

An aerosol-generating article is provided, including: an aerosol-generating substrate including a homogenised dill seed material including dill seed particles, an aerosol former, and a binder, at least 100 micrograms of carvone per gram of the aerosol-generating substrate, on a dry weight basis, and at least 2 micrograms of limonene per gram of the aerosol-generating substrate, on a dry weight basis, in which an amount of carvone per gram of the aerosol-generating substrate is no more than 50 times an amount of limonene per gram of the aerosol-generating substrate. An aerosol-generating substrate, an aerosol, an and a method of making an aerosol-generating substrate, are also provided.

15 Claims, 7 Drawing Sheets

(51) Int. Cl.
  A24B 15/14 (2006.01)
  A24B 15/167 (2020.01)
  A24B 15/30 (2006.01)
  A24D 1/20 (2020.01)

(56) References Cited

U.S. PATENT DOCUMENTS

| | | | |
|---|---|---|---|
| 5,724,988 | A | 3/1998 | Dennehey et al. |
| 2014/0261475 | A1 | 9/2014 | Kizer et al. |
| 2017/0058554 | A1 | 3/2017 | Dull |
| 2017/0325494 | A1 | 11/2017 | Cameron et al. |
| 2021/0368859 | A1 | 12/2021 | Watanabe |

FOREIGN PATENT DOCUMENTS

| | | | | |
|---|---|---|---|---|
| EP | 3 616 537 | A1 | 3/2020 | |
| GB | 983928 | A | 2/1965 | |
| JP | 20220-14455 | A | 1/2020 | |
| JP | 6705042 | | 5/2020 | |
| RU | 1806767 | A1 | 4/1993 | |
| RU | 2 673 615 | C1 | 11/2018 | |
| TW | I394539 | B * | 5/2013 | |
| WO | WO 95/27411 | A1 | 10/1995 | |
| WO | WO 96/32854 | A2 | 2/1998 | |
| WO | WO 2007/010407 | A2 | 1/2007 | |
| WO | WO 2009/022232 | A2 | 2/2009 | |
| WO | WO 2011/060961 | A1 | 5/2011 | |
| WO | WO 2011/101164 | A1 | 8/2011 | |
| WO | WO 2013/034488 | A2 | 3/2013 | |
| WO | WO 2013/068100 | A1 | 5/2013 | |
| WO | WO 2013/068304 | A1 | 5/2013 | |
| WO | WO 2013/178766 | A1 | 12/2013 | |
| WO | WO 2014/154887 | A1 | 10/2014 | |
| WO | WO 2015/082652 | A1 | 6/2015 | |
| WO | WO 2015/091346 | A2 | 6/2015 | |
| WO | WO 2015/177255 | A1 | 11/2015 | |
| WO | WO-2020013339 | A1 * | 1/2020 | ............. A24B 15/12 |
| WO | WO 2020/074494 | A1 | 4/2020 | |
| WO | WO 2020/074535 | A1 | 4/2020 | |
| WO | WO 2020/239597 | A1 | 12/2020 | |
| WO | WO 2021/078683 | A1 | 4/2021 | |
| WO | WO 2021/078691 | A1 | 4/2021 | |
| WO | WO 2021/170655 | A1 | 9/2021 | |
| WO | WO 2021/170670 | A1 | 9/2021 | |

OTHER PUBLICATIONS

Translation of TW I394539 (Year: 2013).*
Combined Russian Office Action and Search Report issued Nov. 7, 2024 on corresponding Russian Patent Application No. 2023101639/03(003389) with English translation therein, 11 pgs.
Arndt, D. et al, "In depth characterization of chemical differences between heat-not-burn tobacco products and cigarettes using LC-HRAM-MS-based non-targeted differential screening" (DOI:10.13140/RG.2.2.11752.16643), Jun. 2018, 2 pages.
Wachsmuth, C. et al, "Comprehensive chemical characterization of complex matrices through integration of multiple analytical modes and databases for LC-HRAM-MS-based non-targeted screening" (DOI: 10.13140/RG.2.2.12701.61927), Jun. 2018, 2 pages.
"Buchholz, C. et al, Increasing confidence for compound identification by fragmentation database and in silico fragmentation comparison with LC-HRAM-MS-based non-targeted screening of complex matrices" (DOI: 10.13140/RG.2.2.17944.49927), Jun. 2018, 2 pages.
Arndt, D. et al, "A complex matrix characterization approach, applied to cigarette smoke, that integrates multiple analytical methods and compound identification strategies for non-targeted liquid chromatography with high-resolution mass spectrometry" (DOI: 10.1002/rcm.8571), 12 pages.
Almstetter et al, "Non-targeted screening using GC×GC-TOFMS for in-depth chemical characterization of aerosol from a heat-not-burn tobacco product" (DOI: 10.13140/RG.2.2.36010.31688/1), Jun. 2018, 2 pages.
Almstetter et al, "Non-targeted differential screening of complex matrices using GC×GC-TOFMS for comprehensive characterization of the chemical composition and determination of significant differences" (DOI: 10.13140/RG.2.2.32692.55680), Jun. 2016, 2 pages.
Schaller et al., "Evaluation of the Tobacco Heating System 2.2. Part 2: Chemical composition, genotoxicity, cytotoxicity and physical properties of the aerosol," Regul. Toxicol. and Pharmacol., 81 (2016) S27-S47.
International Search Report & Written Opinion mailed on Sep. 28, 2021 in PCT/EP2021/067741 filed on Jun. 28, 2021 (9 pages).
Baker R R et al., "The pyrolysis of non-volatile tobacco ingredients using a system that simulates cigarette combustion conditions", Journal of Analytical and Applied Pyrolysis, Elsevier, vol. 74, No. 1-2, 2005, pp. 145-170, XP027671809.
Baker R R et al., "The effect of tobacco ingredients on smoke chemistry. Part I: Flavourings and additives", Food and Chemical Toxicology 42S, Elsevier, vol. 42, No. suppl. 1, 2004, pp. S3-S37, XP009144751.
Combined Chinese Office Action and Search Report issued Mar. 3, 2025 in Chinese Patent Application No. 202180044623.7 (with English Translation), 14 pages.
Wu et al., "Comparative Analysis of Volatile Components in Dill Seed Oil, Dill Oil and their Application Effects in Cigarette", Shandong Chemical Industry, Jul. 8, 2018, 4 pages.
Wang et al., "Analysis of Volatile Aroma Components in Dill Seeds (*Anethiifructus*)", China Condiment, Dec. 12, 2019, 3 pages.
Japanese Office Action issued Jul. 14, 2025 in corresponding Japanese Patent Application No. 2022-580191, with English Translation, 8 pages, citing documents 1. 15, 24-25 therein.
A. Vill et al., Chemical Composition And Antimicrobial Activity Of Essential Oil From Seeds Of Anethum Graveolens Growing In Uzbekistan, Chemistry of Natural Compounds, vol. 45. No. 2, 2009, pp. 280-281, total 3 pages.
Chemical Constituents, Antimicrobial Investigations, and Antioxidant Potentials of Anethum graveolens L. Essential Oil and Acetone Extract, Part 52, Journal of Food Science, 2005, 70, M208-M215 (Abstract Only).
Brazilian Office Action issued Apr. 29, 2025 in corresponding Brazilian Patent Application No. 1120220266898, with English Translation, 5 pages, citing document 1 therein.

* cited by examiner

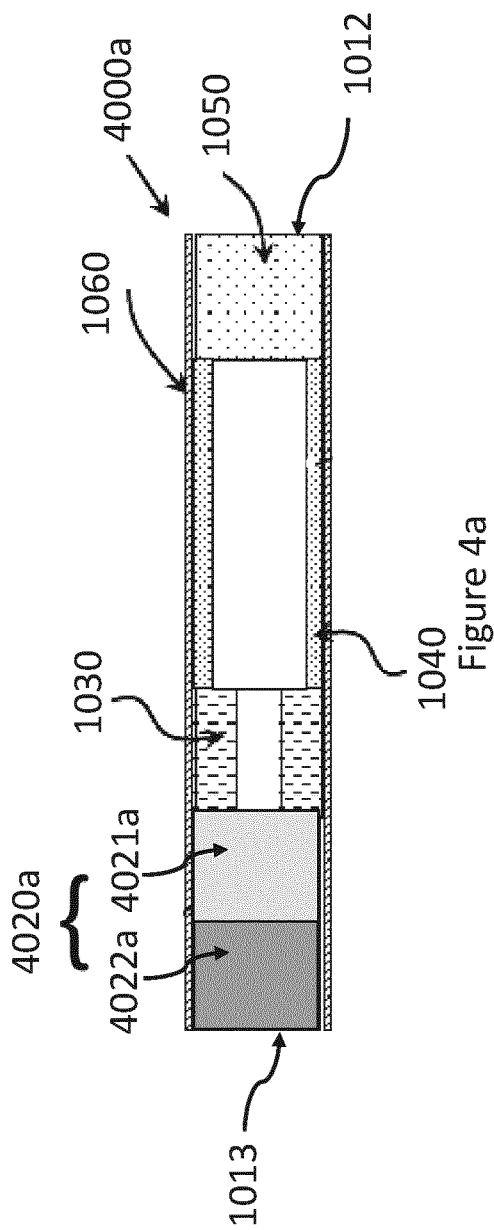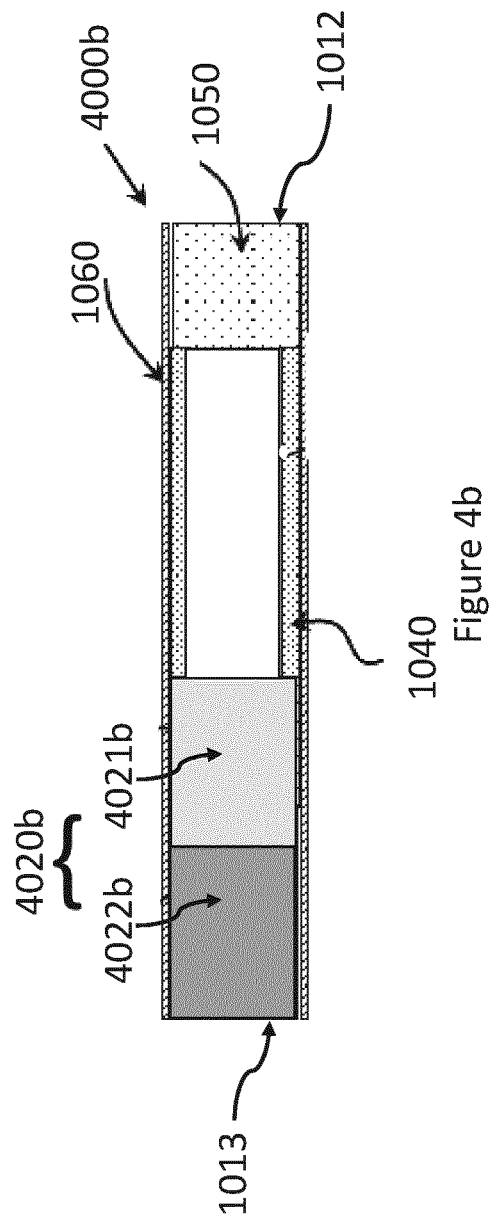

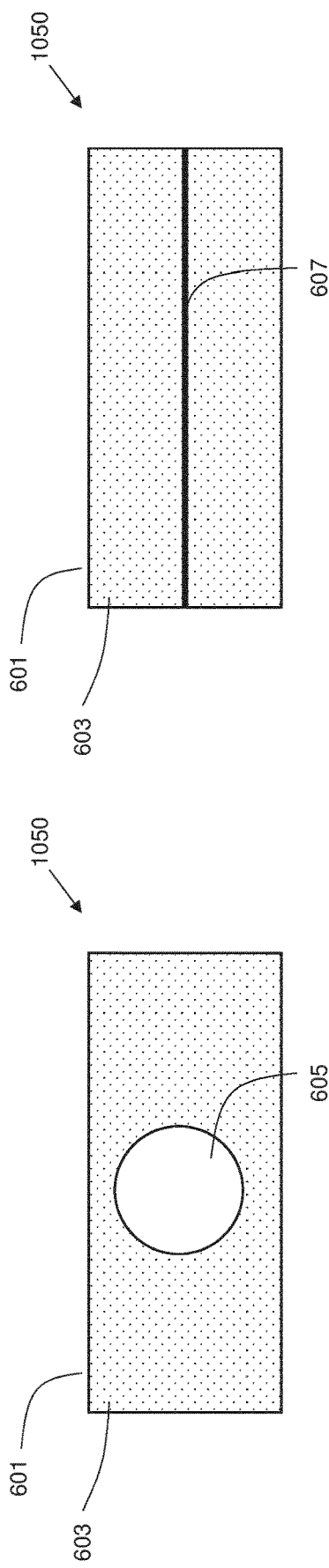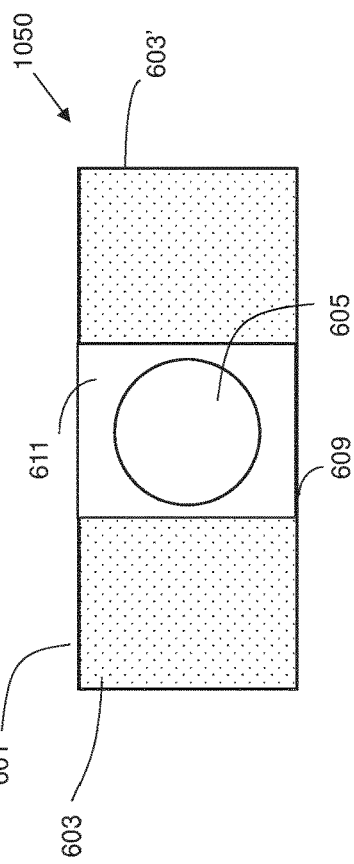

DILL-CONTAINING AEROSOL-GENERATING SUBSTRATE

The present invention relates to aerosol-generating substrates comprising homogenised plant material formed from dill seed particles and to aerosol-generating articles incorporating such an aerosol-generating substrate. The present invention further relates to an aerosol derived from an aerosol-generating substrate comprising dill seed particles.

Aerosol-generating articles in which an aerosol-generating substrate, such as a tobacco-containing substrate, is heated rather than combusted, are known in the art. Typically in such articles, an aerosol is generated by the transfer of heat from a heat source to a physically separate aerosol-generating substrate or material, which may be located in contact with, within, around, or downstream of the heat source. During use of the aerosol-generating article, volatile compounds are released from the substrate by heat transfer from the heat source and are entrained in air drawn through the article. As the released compounds cool, they condense to form an aerosol.

Some aerosol-generating articles comprise a flavourant that is delivered to the consumer during use of the article to provide a different sensory experience to the consumer, for example to enhance the flavour of aerosol. A flavourant can be used to deliver a gustatory sensation (taste), an olfactory sensation (smell), or both a gustatory and an olfactory sensation to the user inhaling the aerosol. It is known to provide heated aerosol-generating articles that include flavourants.

It is also known to provide flavourants in conventional combustible cigarettes, which are smoked by lighting the end of the cigarette opposite the mouthpiece so that the tobacco rod combusts, generating inhalable smoke. One or more flavourants are typically mixed with the tobacco in the tobacco rod in order to provide additional flavour to the mainstream smoke as the tobacco is combusted. Such flavourants can be provided, for example, as essential oil.

Aerosol from a conventional cigarette, which contains a multitude of components interacting with receptors located in the mouth provides a sensation of "mouthfullness," that is to say, a relatively high mouthfeel. "Mouthfeel," as used herein refers to the physical sensations in the mouth caused by food, drink, or aerosol, and is distinct from taste. It is a fundamental sensory attribute which, along with taste and smell, determines the overall flavour of a food item or aerosol.

There are difficulties involved in replicating the consumer experience provided by conventional combustible cigarettes with aerosol-generating articles in which the aerosol-generating substrate is heated rather than combusted. This is partially due to the lower temperatures reached during the heating of such aerosol-generating articles, leading to a different profile of volatile compounds being released.

It would be desirable to provide a novel aerosol-generating substrate for a heated aerosol-generating article providing an aerosol with improved flavour and mouthfullness. It would be particularly desirable if such an aerosol-generating substrate could provide an aerosol with a sensorial experience that is comparable to that provided by a conventional combustible cigarette. It would also be particularly desirable if such an aerosol-generating substrate could provide an aerosol that has reduced levels of undesirable aerosol compounds compared to existing aerosol-generating substrates, for example those containing tobacco only.

It would further be desirable to provide such an aerosol-generating substrate that can be readily incorporated into an aerosol-generating article and which can be manufactured using existing high-speed methods and apparatus.

The present disclosure relates to an aerosol-generating article comprising an aerosol-generating substrate, the aerosol-generating substrate formed of a homogenised plant material including dill seed particles, referred to herein as "homogenised dill seed material". The homogenised dill seed material may comprise dill seed particles. The homogenised dill seed material may further comprise an aerosol former. The homogenised dill seed material may further comprise a binder. The aerosol-generating substrate may further comprise at least about 100 micrograms of carvone per gram of the substrate, on a dry weight basis. The aerosol-generating substrate may further comprise at least about 2 micrograms of limonene per gram of the substrate, on a dry weight basis. The amount of carvone per gram of the substrate may be no more than about 50 times the amount of limonene per gram of the substrate.

According to the invention there is provided an aerosol-generating article comprising an aerosol-generating substrate, the aerosol-generating substrate formed of a homogenised dill seed material including dill seed particles. According to the invention, the homogenised plant material comprises: dill seed particles, an aerosol former and a binder. The aerosol-generating substrate further comprises at least about 100 micrograms of carvone per gram of the substrate, on a dry weight basis; and at least about 2 micrograms of limonene per gram of the substrate, on a dry weight basis. The amount of carvone per gram of the substrate is no more than about 50 times the amount of limonene per gram of the substrate.

Preferably, upon heating of the aerosol-generating substrate of the aerosol-generating article according to the invention according to Test Method A as described below, an aerosol is generated comprising: at least about 20 micrograms of carvone per gram of the substrate, on a dry weight basis; and at least about 2 micrograms of limonene per gram of the substrate, on a dry weight basis, wherein the amount of carvone in the aerosol per gram of the substrate is no more than about 10 times the amount of limonene in the aerosol per gram of the substrate.

Preferably, upon heating of the aerosol-generating substrate according to Test Method A, the aerosol generated from the aerosol-generating substrate may comprise carvone in an amount of at least about 0.5 micrograms per puff of aerosol. Upon heating of the aerosol-generating substrate according to Test Method A, the aerosol generated from the aerosol-generating substrate may comprise limonene in an amount of at least about 0.05 micrograms per puff of aerosol. The amount of carvone per puff of aerosol is preferably no more than about 10 times the amount of limonene per puff of aerosol. A puff of aerosol has a volume of 55 millilitres as generated by a smoking machine.

According to the invention there is provided an aerosol-generating article comprising an aerosol-generating substrate, the aerosol-generating substrate formed of a homogenised dill seed material including dill seed particles. The aerosol-generating substrate comprises comprises at least about 100 micrograms of carvone per gram of the substrate, on a dry weight basis; and at least about 2 micrograms of limonene per gram of the substrate, on a dry weight basis. The amount of carvone per gram of the substrate is no more than about 50 times the amount of limonene per gram of the substrate.

The present disclosure also relates to an aerosol-generating substrate formed of a homogenised plant material comprising dill seed particles, referred to herein as a "homogenised dill seed material". The homogenised dill seed material may further comprise an aerosol former. The homogenised dill seed material may further comprise a binder. The aerosol-generating substrate may comprise at least about 100 micrograms of carvone per gram of the substrate, on a dry weight basis. The aerosol-generating substrate may comprise at least about 2 micrograms of limonene per gram of the substrate, on a dry weight basis. The amount of carvone per gram of the substrate may be no more than about 50 times the amount of limonene per gram of the substrate.

According to the invention there is also provided an aerosol-generating substrate formed of a homogenised dill seed material, wherein the homogenised dill seed material comprises dill seed particles, an aerosol former and a binder. The aerosol-generating substrate further comprises at least 100 micrograms of carvone per gram of the substrate, on a dry weight basis; and at least 2 micrograms of limonene per gram of the substrate, on a dry weight basis, wherein the amount of carvone per gram of the substrate is no more than about 50 times the amount of limonene per gram of the substrate.

The present disclosure additionally relates to an aerosol produced upon heating of an aerosol-generating substrate. The aerosol may comprise carvone in an amount of at least about 0.5 micrograms per puff of aerosol. The aerosol may comprise limonene in an amount of at least about 0.05 micrograms per puff of aerosol. The amount of carvone in the aerosol per gram of the substrate may be no more than about 10 times the amount of limonene in the aerosol per gram of the substrate. A puff of aerosol has a volume of 55 millilitres as generated by a smoking machine.

According to the present invention there is further provided an aerosol produced upon heating of an aerosol-generating substrate, the aerosol comprising: carvone in an amount of at least about 0.5 micrograms per puff of aerosol; and limonene in an amount of at least about 0.05 micrograms per puff of aerosol, wherein the amount of carvone in the aerosol per gram of the substrate is no more than about 10 times the amount of limonene in the aerosol per gram of the substrate and wherein a puff of aerosol has a volume of 55 millilitres as generated by a smoking machine.

The present invention further provides a method of making an aerosol-generating substrate comprising: forming a slurry comprising dill seed particles, water, an aerosol former, a binder and optionally tobacco particles; casting or extruding the slurry in the form of a sheet or strands; and drying the sheets or strands, preferably at a temperature of between 80 and 160 degrees Celsius. Where a sheet of aerosol-generating substrate is formed, the sheet may optionally be cut into strands or gathered the sheet to form a rod. The sheet may optionally be crimped prior to the gathering step.

Any references below to the aerosol-generating substrates and aerosols of the present invention should be considered to be applicable to all aspects of the invention, unless stated otherwise.

As used herein, the term "aerosol-generating article" refers to an article for producing an aerosol, wherein the article comprises an aerosol-generating substrate that is suitable and intended to be heated or combusted in order to release volatile compounds that can form an aerosol. A conventional cigarette is lit when a user applies a flame to one end of the cigarette and draws air through the other end. The localised heat provided by the flame and the oxygen in the air drawn through the cigarette causes the end of the cigarette to ignite, and the resulting combustion generates an inhalable smoke. By contrast, in "heated aerosol-generating articles", an aerosol is generated by heating an aerosol-generating substrate and not by combusting the aerosol-generating substrate. Known heated aerosol-generating articles include, for example, electrically heated aerosol-generating articles and aerosol-generating articles in which an aerosol is generated by the transfer of heat from a combustible fuel element or heat source to a physically separate aerosol-generating substrate.

Also known are aerosol-generating articles that are adapted to be used in an aerosol-generating system that supplies the aerosol former to the aerosol-generating articles. In such a system, the aerosol-generating substrate in the aerosol-generating articles contain substantially less aerosol former relative to those aerosol-generating substrate which carries and provides substantially all the aerosol former used in forming the aerosol during operation.

As used herein, the term "aerosol-generating substrate" refers to a substrate capable of producing upon heating volatile compounds, which can form an aerosol. The aerosol generated from aerosol-generating substrates may be visible to the human eye or invisible and may include vapours (for example, fine particles of substances, which are in a gaseous state, that are ordinarily liquid or solid at room temperature) as well as gases and liquid droplets of condensed vapours.

As used herein, the term "homogenised plant material" encompasses any plant material formed by the agglomeration of particles of plant. For example, sheets or webs of homogenised plant material for the aerosol-generating substrates of the present invention may be formed by agglomerating particles of plant material obtained by pulverising, grinding or comminuting dill seed plant material and optionally tobacco material such as tobacco leaf lamina or tobacco leaf stems. The homogenised plant material may be produced by casting, extrusion, paper making processes or other any other suitable processes known in the art.

As used herein, the term "homogenised dill seed material" refers to a homogenised plant material comprising dill seed particles, optionally in combination with tobacco particles. The term "homogenised tobacco material" refers to a homogenised plant material comprising tobacco particles but no dill seed particles, which is therefore not in accordance with the invention.

As used herein, the term "dill seed particles" encompasses particles derived from the seeds of a dill plant (*Anethum graveolens*). Dill is an annual herbaceous plant of the *Anethum* species, in the celery family Apiaceae, which is grown widely in Europe and Asia. Dill leaves and dill seeds are commonly used for flavouring foods.

By contrast, dill oil is a distillate extracted from the leaves, stems and seeds of the plant, and carvone and limonene are compounds derived from dill seed.

The present invention provides an aerosol-generating article incorporating an aerosol-generating substrate formed of a homogenised plant material including dill seed particles, referred to herein as a homogenised dill seed material. The present invention also provides an aerosol derived from such an aerosol-generating substrate. The inventors of the present invention have found that through the incorporation of dill seed particles into the aerosol-generating substrate, it is advantageously possible to produce an aerosol which provides a novel sensory experience. Such an aerosol provides unique flavours and may provide an increased level of mouthfullness.

In addition, the inventors have found that it is advantageously possible to produce an aerosol with an improved dill seed aroma and flavour compared to the aerosol produced through the addition of dill seed additives such as dill oil. Dill oil (Chemical Abstracts Service Registry Number 8006-75-5) is obtained by steam distillation from the dill plant, mainly the dill seeds. It has a composition of flavourants that are different from dill seed particles, presumably due to the distillation process which may selectively remove or retain certain flavourants. Carvone is one of the main constituents of dill oil. Limonene is also present in dill oil although at a significantly lower level than limonene.

Moreover, in certain aerosol-generating substrates provided herein, dill seed particles may be incorporated at a sufficient level to provide the desired dill seed flavour whilst maintaining sufficient tobacco material to provide the desired level of nicotine to the consumer.

Furthermore, it has been surprisingly found that the inclusion of dill seed particles in an aerosol-generating substrate provides a significant reduction in certain undesirable aerosol compounds compared to an aerosol produced from an aerosol-generating substrate comprising 100 percent tobacco particles without dill seed particles. In particular, as shown below, it has been surprisingly found that the inclusion of dill seed particles in an aerosol-generating substrate provides a significant reduction in certain polycyclic aromatic hydrocarbons (PAHs) and phenolic compounds compared to an aerosol produced from an aerosol-generating substrate comprising 100 percent tobacco particles without dill seed particles. Furthermore, this reduction has been found to be greater than would be expected on a proportional basis as a result of the reduction in tobacco particles.

The presence of dill seed in homogenised plant material (such as cast leaf) can be positively identified by DNA barcoding. Methods for performing DNA barcoding based on the nuclear gene ITS2, the rbcL and matK system as well as the plastid intergenic spacer trnH-psbA, are well known in the art and can be used (Chen S, Yao H, Han J, Liu C, Song J, et al. (2010) Validation of the ITS2 Region as a Novel DNA Barcode for Identifying Medicinal Plant Species. PLoSONE 5(1): e8613; Hollingsworth P M, Graham S W, Little D P (2011) Choosing and Using a Plant DNA Barcode. PLoS ONE 6(5): e19254).

The inventors have carried out a complex analysis and characterisation of the aerosols generated from aerosol-generating substrates of the present invention incorporating dill seed particles and a mixture of dill seed particles and tobacco particles, and a comparison of these aerosols with those produced from existing aerosol-generating substrates formed from tobacco material without dill seed particles. Based on this, the inventors have been able to identify a group of "characteristic compounds" that are compounds present in the aerosols and which have derived from the dill seed particles. The detection of these characteristic compounds within an aerosol within a specific range of weight proportion can therefore be used to identify aerosols that have derived from an aerosol-generating substrate including dill seed particles. These characteristic compounds are notably not present, or present in only a very low amount, in an aerosol generated from tobacco material. Furthermore, the proportion of the characteristic compounds within the aerosol and the ratio of the characteristic compounds to each other are clearly indicative of the use of dill seed plant material and not a dill oil. Similarly, the presence of these characteristic compounds in specific proportions within an aerosol-generating substrate is indicative of the inclusion of dill seed particles in the substrate.

In particular, the defined levels and ratio of the characteristic compounds within the substrate and the aerosol are specific to the dill seed particles present within the homogenised dill seed material. The level of each characteristic compound is dependent upon the way in which the dill seed particles have been processed during production of the homogenised dill seed material. The level is also dependent upon the composition of the homogenised dill seed material and in particular, will be affected by the level of other components within the homogenised dill seed material. The level of the characteristic compounds within the homogenised dill seed material will be different to the level of the same compound within the starting dill seed material. It will also be different to the level of the characteristic compounds within materials containing dill seed particles but that are not in accordance with the invention as defined herein.

In order to carry out the characterisation of the aerosols, the inventors have made use of complementary non-targeted differential screening (NTDS) using liquid chromatography coupled to high-resolution accurate-mass mass spectrometry (LC-HRAM-MS) in parallel with two-dimensional gas chromatography coupled to time-of-flight mass spectrometry (GCxGC-TOFMS).

Non-targeted screening (NTS) is a key methodology for characterising the chemical composition of complex matrices by either matching unknown detected compound features against spectral databases (suspect screening analysis [SSA]), or if no pre-knowledge matches, by elucidating the structure of unknowns using e.g. first order fragmentation (MS/MS) derived information matched to in silico predicted fragments from compound databases (non-targeted analysis [NTA]). It enables the simultaneous measurement and capability for semi-quantification of a large number of small molecules from samples using an unbiased approach.

If the focus is on the comparison of two or more aerosol samples, as described above, to evaluate any significant differences in chemical composition between samples in an unsupervised way or if group related pre-knowledge is available between sample groups, non-targeted differential screening (NTDS) may be performed. A complementary differential screening approach using liquid chromatography coupled to high-resolution accurate-mass mass spectrometry (LC-HRAM-MS) in parallel with two-dimensional gas chromatography coupled to time-of-flight mass spectrometry (GCxGC-TOFMS) has been applied in order to ensure comprehensive analytical coverage for identifying the most relevant differences in aerosol composition between aerosols derived from articles comprising 100% by weight dill seed as the particulate plant material and those derived from articles comprising 100% by weight tobacco as the particulate plant material.

The aerosol was generated and collected using the apparatus and methodology set out in detail below.

LC-HRAM-MS analysis was carried out using a Thermo QExactive™ high resolution mass spectrometer in both full scan mode and data dependent mode. In total, three different methods were applied in order to cover a wide range of substances with different ionization properties and compound classes. Samples were analysed using RP chromatography with heated electrospray ionisation (HESI) in both positive and negative modes and with atmospheric pressure chemical ionisation (APCI) in positive mode. The methods are described in: Arndt, D. et al, "In depth characterization of chemical differences between heat-not-burn tobacco products and cigarettes using LC-HRAM-MS-based non-targeted differential screening" (DOI:10.13140/RG.2.2.11752.16643); Wachsmuth, C. et al, "Comprehensive chemical characterisation of complex matrices through integration of multiple analytical modes and databases for LC-HRAM-MS-based non-targeted screening" (DOI: 10.13140/RG.2.2.12701.61927); and "Buchholz, C. et al, "Increasing confidence for compound identification by fragmentation database and in silico fragmentation comparison with LC-HRAM-MS-based non-targeted screening of complex matrices" (DOI: 10.13140/RG.2.2.17944.49927), all from the 66th ASMS Conference on Mass Spectrometry and Allied Topics, San Diego, USA (2018). The methods are further described in: Arndt, D. et al, "A complex matrix characterization approach, applied to cigarette smoke, that integrates multiple analytical methods and compound identification strategies for non-targeted liquid chromatography with high-resolution mass spectrometry" (DOI: 10.1002/rcm.8571).

GCxGC-TOFMS analysis was carried out using an Agilent GC Model 6890A or 7890A instrument equipped with an Auto Liquid Injector (Model 7683B) and a Thermal Modulator coupled to a LECO Pegasus 4D™ mass spectrometer with three different methods for nonpolar, polar and highly volatile compounds within the aerosol. The methods are described in: Almstetter et al, "Non-targeted screening using GCxGC-TOFMS for in-depth chemical characterization of aerosol from a heat-not-burn tobacco product" (DOI: 10.13140/RG.2.2.36010.31688/1); and Almstetter et al, "Non-targeted differential screening of complex matrices using GCxGC-TOFMS for comprehensive characterization of the chemical composition and determination of significant differences" (DOI: 10.13140/RG.2.2.32692.55680), from the 66th and 64th ASMS Conferences on Mass Spectrometry and Allied Topics, San Diego, USA, respectively.

The results from the analysis methods provided information regarding the major compounds responsible for the differences in the aerosols generated by such articles. The focus of the non-targeted differential screening using both analytical platforms LC-HRAM-MS and GCxGC-TOFMS was on compounds that were present in greater amounts in the aerosols of a sample of an aerosol-generating substrate according to the invention comprising 100 percent dill seed particles relative to a comparative sample of an aerosol-generating substrate comprising 100 percent tobacco particles. The NTDS methodology is described in the papers listed above.

Based on this information, the inventors were able to identify specific compounds within the aerosol that may be considered as "characteristic compounds" deriving from the dill seed particles in the substrate. Characteristic compounds deriving from dill seed include but are not limited to: limonene (1-Methyl-4-(prop-1-en-2-yl)cyclohex-1-ene, chemical formula: $C_{10}H_{16}$, Chemical Abstracts Service Registry Number 138-86-3); and carvone (2-Methyl-5-(prop-1-en-2-yl)cyclohex-2-en-1-one, chemical formula: $C_{10}H_{20}O$, Chemical Abstracts Service Registry Number 99-49-0).

For the purposes of the present invention, a targeted screening can be conducted on a sample of aerosol-generating substrate to identify the presence and amount of each of the characteristic compounds in the substrate. Such a targeted screening method is described below. As described, the characteristic compounds can be detected and measured in both the aerosol-generating substrate and the aerosol derived from the aerosol-generating substrate.

As defined above, the aerosol-generating article of the invention comprises an aerosol-generating substrate formed of a homogenised plant material comprising dill seed particles. As a result of the inclusion of the dill seed particles, the aerosol-generating substrate comprises certain proportions of the "characteristic compounds" of dill seed, as described above. In particular, the aerosol-generating substrate preferably comprises at least 100 micrograms of carvone per gram of the substrate and at least 2 micrograms of limonene per gram of the substrate, on a dry weight basis.

For the purposes of the present invention, the amount of carvone should be taken as the total combined amount of the carvone stereoisomers: L-carvone and D-carvone. Similarly, the amount of limonene should be taken as the total combined amount of the limonene stereoisomers: L-limonene and D-limonene.

By defining an aerosol-generating substrate with respect to the desired levels of the characteristic compounds, it is possible to ensure consistency between products despite potential differences in the levels of the characteristic compounds in the raw materials. This advantageously enables the quality of the product to be controlled more effectively.

Preferably, the aerosol-generating substrate comprises at least about 250 micrograms of carvone per gram of the substrate, more preferably at least about 500 micrograms of carvone per gram of the substrate, on a dry weight basis. Alternatively or in addition, the aerosol-generating substrate preferably comprises no more than about 4500 micrograms of carvone per gram of the substrate, more preferably no more than about 4000 micrograms of carvone per gram of the substrate, more preferably no more than about 3000 micrograms of carvone per gram of the substrate, on a dry weight basis.

For example, the aerosol-generating substrate may comprise between about 100 micrograms and about 4500 micrograms carvone per gram of the substrate, or between about 250 micrograms and about 4000 micrograms carvone per gram of the substrate, or between about 500 micrograms and about 3000 micrograms carvone per gram of the substrate, on a dry weight basis.

In certain preferred embodiments, the aerosol-generating substrate may comprise between about 100 micrograms and about 1500 micrograms carvone per gram of the aerosol-generating substrate, more preferably between about 250 micrograms and about 1000 micrograms carvone per gram of the aerosol-generating substrate. For example, the level of carvone may be within these ranges for a first preferred embodiment of the invention in which the aerosol-generating substrate comprises between 2.5 percent by weight and 25 percent by weight of dill seed particles, on a dry weight basis, as described below.

Preferably, the aerosol-generating substrate comprises at least about 10 micrograms of limonene per gram of the substrate, more preferably at least about 25 micrograms of limonene per gram of the substrate, on a dry weight basis. Alternatively or in addition, the aerosol-generating substrate preferably comprises no more than about 200 micrograms of limonene per gram of the substrate, more preferably no more than about 150 micrograms of limonene per gram of the substrate, more preferably no more than about 100 micrograms of limonene per gram of the substrate, on a dry weight basis.

For example, the aerosol-generating substrate may comprise between about 2 micrograms and about 200 micrograms limonene per gram of the substrate, or between about 10 micrograms and about 150 micrograms limonene per gram of the substrate, or between about 25 micrograms and about 100 micrograms limonene per gram of the substrate, on a dry weight basis.

In certain particularly preferred embodiments, the aerosol-generating substrate may comprise between about 2 micrograms and about 50 micrograms limonene per gram of the aerosol-generating substrate, more preferably between about 10 micrograms and about 40 micrograms limonene per gram of the aerosol-generating substrate. For example, the level of limonene may be within these ranges for a first preferred embodiment of the invention in which the aerosol-generating substrate comprises between 2.5 percent by weight and 25 percent by weight of dill seed particles, on a dry weight basis, as described below.

As defined above, the ratio of the characteristic compounds in the aerosol-generating substrate is such that the amount of carvone per gram of the substrate is no more than about 50 times the amount of limonene per gram of the substrate, more preferably no more than about 40 times the amount of limonene per gram of the substrate, more preferably no more than about 35 times the amount of limonene per gram of the substrate. The ratio of carvone to limonene in the aerosol-generating substrate is therefore significantly lower than the ratio of carvone to limonene in dill oil, due to the much higher relative proportion of carvone that is present in the oil compared to the dill seed particles.

The ratio of carvone to limonene is therefore characteristic of the inclusion of dill seed particles in the aerosol-generating substrate.

As defined above, the invention also provides an aerosol-generating article that comprises an aerosol-generating substrate formed of a homogenised plant material comprising dill seed particles, wherein upon heating of the aerosol-generating substrate, an aerosol is generated which comprises the "characteristic compounds" of dill seed.

For the purposes of the invention, the aerosol-generating substrate is heated according to "Test Method A". In Test Method A, an aerosol-generating article incorporating the aerosol-generating substrate is heated in a Tobacco Heating System 2.2 holder (THS2.2 holder) under the Health Canada machine-smoking regimen. For the purposes of carrying out Test Method A, the aerosol-generating substrate is provided in an aerosol-generating article that is compatible with the THS2.2 holder.

The Tobacco Heating System 2.2 holder (THS2.2 holder) corresponds to the commercially available IQOS device (Philip Morris Products SA, Switzerland) as described in Smith et al., 2016, Regul. Toxicol. Pharmacol. 81 (S2) S82-S92. Aerosol-generating articles for use in conjunction with the IQOS device are also commercially available.

The Health Canada smoking regimen is a well-defined and accepted smoking protocol as defined in Health Canada 2000—Tobacco Products Information Regulations SOR/2000-273, Schedule 2; published by Ministry of Justice Canada. The test method is described in ISO/TR 19478-1:2014. In a Health Canada smoking test, an aerosol is collected from the sample aerosol-generating substrate over 12 puffs with a puff volume of 55 millimetres, puff duration of 2 seconds and puff interval of 30 seconds, with all ventilation blocked if ventilation is present.

Thus, in the context of the present invention, the expression "upon heating of the aerosol-generating substrate according to Test Method A" means upon heating of the aerosol-generating substrate in a THS2.2 holder under the Health Canada machine-smoking regimen as defined in Health Canada 2000—Tobacco Products Information Regulations SOR/2000-273, Schedule 2; published by Ministry of Justice Canada, the test method being described in ISO/TR 19478-1:2014.

For the purposes of analysis, the aerosol generated from the heating of the aerosol-generating substrate is trapped using suitable apparatus, depending upon the method of analysis that is to be used. In a suitable method for generating samples for analysis by LC-HRAM-MS, the particulate phase is trapped using a conditioned 44 mm Cambridge glass fiber filter pad (according to ISO 3308) and a filter holder (according to ISO 4387 and ISO 3308). The remaining gas phase is collected downstream from the filter pad using two consecutive micro-impingers (20 mL) containing methanol and internal standard (ISTD) solution (10 mL) each, maintained at −60 degrees Celsius, using a dry ice-isopropanol mixture. The trapped particulate phase and gas phase are then recombined and extracted using the methanol from the micro-impingers, by shaking the sample, vortexing for 5 minutes and centrifuging (4500 g, 5 minutes, 10 degrees Celsius). The resultant extract is diluted with methanol and mixed in an Eppendorf ThermoMixer (5 degrees Celsius, 2000 rpm). Test samples from the extract are analysed by LC-HRAM-MS in combined full scan mode and data dependent fragmentation mode for identification of the characteristic compounds. For the purposes of the invention, LC-HRAM-MS analysis is suitable for the identification and quantification of carvone.

Samples for analysis by GCxGC-TOFMS may be generated in a similar way but for GCxGC-TOFMS analysis, different solvents are suitable for extracting and analysing polar compounds, non-polar compounds and volatile compounds separated from whole aerosol.

For non-polar and polar compounds, whole aerosol is collected using a conditioned 44 mm Cambridge glass fiber filter pad (according to ISO 3308) and a filter holder (according to ISO 4387 and ISO 3308), followed by two micro-impingers connected and sealed in series. Each micro-impinger (20 mL) contains 10 mL dichloromethane/methanol (80:20 v/v) containing internal standard (ISTD) and retention index marker (RIM) compounds. The micro-impingers are maintained at −80 degrees Celsius, using a dry ice-isopropanol mixture. For analysis of the non-polar compounds, the particulate phase of the whole aerosol is extracted from the glass fiber filter pad using the contents of the micro-impingers. Water is added to an aliquot (10 mL) of the resulting extract and the sample is shaken and centrifuged as described above. The dichloromethane layer is separated, dried with sodium sulphate and analysed by GCxGC-TOFMS in full scan mode. For analysis of the polar compounds, the remaining water layer from the non-polar sample preparation described above is used. ISTD and RIM compounds are added to the water layer, which is then directly analysed by GCxGC-TOFMS in full scan mode.

For volatile compounds, whole aerosol is collected using two micro-impingers (20 mL) connected and sealed in series, each filled with 10 mL N,N-dimethylformamide (DMF) containing ISTD and RIM compounds. The micro-impingers are maintained at between −50 and −60 degrees Celsius using a dry ice-isopropanol mixture. After collection, the contents of the two micro-impingers are combined and analysed by GCxGC-TOFMS in full scan mode.

For the purposes of the invention, GCxGC-TOFMS analysis is suitable for the identification and quantification of carvone and limonene.

The aerosol generated upon heating of the aerosol-generating substrate of the invention according to Test Method A is preferably characterised by the amounts and ratios of the characteristic compounds, carvone and limonene, as defined above.

Preferably, in an aerosol-generating article comprising an aerosol-generating substrate as described above, upon heating the aerosol-generating substrate according to Test Method A, an aerosol is generated comprising at least about 20 micrograms of carvone per gram of the substrate, on a dry weight basis; and at least about 2 micrograms of limonene per gram of the substrate, on a dry weight basis. Preferably, the amount of carvone in the aerosol per gram of the substrate is no more than about 10 times the amount of limonene in the aerosol per gram of substrate.

The ranges define the amount of each of the characteristic compounds in the aerosol generated per gram of the aerosol-generating substrate (also referred to herein as the "substrate"). This equates to the total amount of the characteristic compound measured in the aerosol collected during Test Method A, divided by the dry weight of the aerosol-generating substrate prior to heating.

Upon heating of the aerosol-generating substrate according to Test Method A, an aerosol is preferably generated that preferably comprises at least about 100 micrograms of carvone per gram of the substrate, on a dry weight basis. More preferably, the aerosol generated from an aerosol-generating substrate according to the present invention comprises at least about 200 micrograms of carvone per gram of the substrate, on a dry weight basis.

Alternatively, or in addition, the aerosol generated from the aerosol-generating substrate preferably comprises up to about 1500 micrograms of carvone per gram of the substrate, on a dry weight basis. More preferably, the aerosol generated from the aerosol-generating substrate comprises up to about 1200 micrograms of carvone per gram of the substrate, on a dry weight basis. Even more preferably, the aerosol generated from the aerosol-generating substrate comprises up to about 1000 micrograms of carvone per gram of the substrate, on a dry weight basis.

In certain embodiments of the invention, the aerosol generated from the aerosol-generating substrate may comprise up to 500 micrograms of carvone per gram of the substrate, more preferably up to 300 micrograms of carvone per gram of substrate, on a dry weight basis. For example, the level of carvone may be within these ranges for a first preferred embodiment of the invention in which the aerosol-generating substrate comprises between 2.5 percent by weight and 25 percent by weight of dill seed particles, on a dry weight basis, as described below.

Upon heating of the aerosol-generating substrate according to Test Method A, an aerosol is generated that preferably comprises at least about 20 micrograms of limonene per gram of the substrate, on a dry weight basis. More preferably, the aerosol generated from an aerosol-generating substrate according to the present invention comprises at least about 50 micrograms of limonene per gram of the substrate, on a dry weight basis.

Alternatively, or in addition, the aerosol generated from the aerosol-generating substrate preferably comprises up to about 300 micrograms of limonene per gram of the substrate, on a dry weight basis. More preferably, the aerosol generated from the aerosol-generating substrate comprises up to about 250 micrograms of limonene per gram of the substrate, on a dry weight basis. Even more preferably, the aerosol generated from the aerosol-generating substrate comprises up to about 200 micrograms of limonene per gram of the substrate, on a dry weight basis.

In certain embodiments of the invention, the aerosol generated from the aerosol-generating substrate may comprise up to 100 micrograms of limonene per gram of the substrate, more preferably up to 75 micrograms of limonene per gram of substrate, on a dry weight basis. For example, the level of carvone may be within these ranges for a first preferred embodiment of the invention in which the aerosol-generating substrate comprises between 2.5 percent by weight and 25 percent by weight of dill seed particles, on a dry weight basis, as described below.

Preferably, the aerosol produced from an aerosol-generating substrate according to the present invention during Test Method A further comprises at least about 0.1 micrograms of nicotine per gram of the substrate, more preferably at least about 1 microgram of nicotine per gram of the substrate, more preferably at least about 2 micrograms of nicotine per gram of the substrate. Preferably, the aerosol comprises up to about 10 micrograms of nicotine per gram of the substrate, more preferably up to about 7.5 micrograms of nicotine per gram of the substrate, more preferably up to about 4 micrograms of nicotine per gram of the substrate. For example, the aerosol may comprise between about 0.1 micrograms and about 10 micrograms of nicotine per gram of the substrate, or between about 1 microgram and about 7.5 micrograms of nicotine per gram of the substrate, or between about 2 micrograms and about 4 micrograms of nicotine per gram of the substrate. In some embodiments of the present invention, the aerosol may contain zero micrograms of nicotine.

Various methods known in the art can be applied to measure the amount of nicotine in the aerosol.

Alternatively or in addition, the aerosol produced from an aerosol-generating substrate according to the present invention during Test Method A may optionally further comprise at least about 20 milligrams of a cannabinoid compound per gram of the substrate, more preferably at least about 50 milligrams of a cannabinoid compound per gram of the substrate, more preferably at least about 100 milligrams of a cannabinoid compound per gram of the substrate. Preferably, the aerosol comprises up to about 250 milligrams of a cannabinoid compound per gram of the substrate, more preferably up to about 200 milligrams of a cannabinoid compound per gram of the substrate, more preferably up to about 150 milligrams of a cannabinoid compound per gram of the substrate. For example, the aerosol may comprise between about 20 milligrams and about 250 milligrams of a cannabinoid compound per gram of the substrate, or between about 50 milligrams and about 200 milligrams of a cannabinoid compound per gram of the substrate, or between about 100 milligrams and about 150 milligrams of a cannabinoid compound per gram of the substrate. In some embodiments of the present invention, the aerosol may contain zero micrograms of cannabinoid compound.

Preferably, the cannabinoid compound is selected from CBD and THC. More preferably, the cannabinoid compound is CBD.

Various methods known in the art can be applied to measure the amount of a cannabinoid compound in the aerosol.

Carbon monoxide may also be present in the aerosol generated from an aerosol-generating substrate according to the invention during Test Method A and may be measured and used to further characterise the aerosol. Oxides of nitrogen such as nitric oxide and nitrogen dioxide may also be present in the aerosol and may be measured and used to further characterise the aerosol.

According to the present invention, the aerosol generated from the aerosol-generating substrate during Test Method A preferably has an amount of carvone per gram of the substrate that is preferably no more than 10 times the amount of limonene per gram of the substrate. The ratio of carvone to limonene is therefore no more than 10:1. More preferably, the amount of carvone in the aerosol generated from the aerosol-generating substrate during Test Method A is no more than 8 times the amount of limonene per gram of the substrate, such that the ratio of carvone to limonene is no more than 8:1.

The defined ratio of carvone to limonene characterises an aerosol that is derived from dill seed particles. In contrast, in an aerosol produced from dill oil, the ratio of carvone to limonene would be significantly different, due to the much higher relative proportion of carvone that is present in the oil relative to the dill seed particles.

The aerosol produced from an aerosol-generating substrate according to the invention during Test Method A may further comprise at least about 5 milligrams of aerosol former per gram of aerosol-generating substrate, or at least about 10 milligrams of aerosol per gram of the substrate or at least about 15 milligrams of aerosol former per gram of the substrate. Alternatively or in addition, the aerosol may comprises up to about 30 milligrams of aerosol former per gram of the substrate, or up to about 25 milligrams aerosol former per gram of the substrate, or up to about 20 milligrams aerosol former per gram of the substrate. For example, the aerosol may comprise between about 5 milligrams and about 30 milligrams of aerosol former per gram of the substrate, or between about 10 milligrams and about 25 milligrams of aerosol former per gram of the substrate, or between about 15 milligrams and about 20 milligrams of aerosol former per gram of the substrate. In alternative embodiments, the aerosol may comprise less than 5 milligrams of aerosol former per gram of substrate. This may be appropriate, for example, if an aerosol former is provided separately within the aerosol-generating article or aerosol-generating device.

Suitable aerosol formers for use in the present invention are set out below.

Various methods known in the art can be applied to measure the amount of aerosol former in the aerosol.

As described above, the presence of the characteristic compounds in the aerosol in the amounts and ratios defined is indicative of the inclusion of dill seed particles in the homogenised plant material forming the aerosol-generating substrate.

Preferably, the aerosol-generating substrate of aerosol-generating articles according to the invention comprises a homogenised dill seed material comprising at least about 2.5 percent by weight of dill seed particles, on a dry weight basis. Preferably, the homogenised dill seed material comprises at least about 3 percent by weight of dill seed particles, more preferably at least about 4 percent by weight of dill seed particles, more preferably at least about 5 percent by weight of dill seed particles, more preferably at least about 6 percent by weight of dill seed particles, more preferably at least about 7 percent by weight of dill seed particles, more preferably at least about 8 percent by weight of dill seed particles, more preferably at least about 9 percent by weight of dill seed particles, more preferably at least about 10 percent by weight of dill seed particles, on a dry weight basis.

The homogenised dill seed material may comprise up to about 100 percent by weight of dill seed particles, on a dry weight basis. Preferably, the homogenised plant material comprises up to about 90 percent by weight of dill seed particles, more preferably up to about 80 percent by weight of dill seed particles, more preferably up to about 70 percent by weight of dill seed particles, more preferably up to about 60 percent by weight of dill seed particles, more preferably up to about 50 percent by weight of dill seed particles, on a dry weight basis.

For example, the homogenised dill seed material may comprise between about 2.5 percent and about 100 percent by weight of dill seed particles, or about 5 percent and about 90 percent by weight of dill seed particles, or between about 10 percent and about 80 percent by weight of dill seed particles, or between about 15 percent and about 70 percent by weight of dill seed particles, or between about 20 percent and about 60 percent by weight of dill seed particles, or between about 30 percent and about 50 percent by weight of dill seed particles, on a dry weight basis.

In certain particularly preferred embodiments of the invention, the homogenised dill seed material comprises between about 15 percent by weight and about 20 percent by weight of dill seed particles, on a dry weight basis.

The amount by weight of dill seed particles that it is possible to incorporate into the homogenised dill seed material, whilst providing a useable material for an aerosol-generating article, may depend to a certain extent upon the composition of the homogenised dill seed material. For example, the maximum amount of dill seed particles that it is possible to incorporate into the homogenised dill seed material may depend upon the nature of the binder, as described below.

According to a first preferred embodiment of the invention, the homogenised dill seed material comprises up to about 25 percent by weight of dill seed particles, preferably up to about 24 percent by weight of dill seed particles, more preferably up to about 23 percent by weight of dill seed particles, more preferably up to about 22 percent by weight of dill seed particles, more preferably up to about 20 percent by weight of dill seed particles, on a dry weight basis. For example, the homogenised dill seed material of aerosol-generating articles according to a first preferred embodiment of the invention comprises between about 2.5 percent and about 25 percent by weight of dill seed particles, or about 4 percent and about 24 percent by weight of dill seed particles, or between about 5 percent and about 23 percent by weight of dill seed particles, or between about 6 percent and about 22 percent by weight of dill seed particles, or between about 8 percent and about 21 percent by weight of dill seed particles, or between about 10 percent and about 20 percent by weight of dill seed particles, on a dry weight basis.

According to a second preferred embodiment of the invention, the homogenised dill seed material comprises up to about 65 percent by weight of dill seed particles, more preferably up to about 60 percent by weight of dill seed particles, more preferably up to about 55 percent by weight of dills seed particles, more preferably up to about 50 percent by weight of dill seed particles, more preferably up to about 45 percent by weight of dill seed particles. For example, the homogenised dill seed material of aerosol-generating articles according to a first preferred embodiment of the invention comprises between about 2.5 percent and about 65 percent by weight of dill seed particles, or about 10 percent and about 60 percent by weight of dill seed particles, or between about 15 percent and about 55 percent by weight of dill seed particles, or between about 20 percent and about 50 percent by weight of dill seed particles, or between about 30 percent and about 45 percent by weight of dill seed particles, or between about 35 percent and about 45 percent by weight of dill seed particles, on a dry weight basis.

In certain embodiments of the invention, the plant particles forming the homogenised dill seed material may include at least 98 percent by weight of dill seed particles or at least 95 percent by weight of dill seed particles or at least 90 percent by weight of dill seed particles, based on dry weight of the plant particles. In such embodiments, the aerosol-generating substrate therefore comprises dill seed particles, with substantially no other plant particles. For example, the plant particles forming the homogenised dill seed material may comprise about 100 percent by weight of dill seed particles.

In alternative embodiments of the invention, the homogenised dill seed material may comprise dill seed particles in combination with at least one of tobacco particles or *cannabis* particles, as described below.

In the following description of the invention, the terms "particulate plant material" and "plant particles" are used to refer collectively to the particles of plant material that are used to form the homogenised plant material. The particulate plant material may consist substantially of dill seed particles or may be a mixture of dill seed particles with tobacco particles, *cannabis* particles, or both tobacco particles and *cannabis* particles.

As described above, the inventors have identified a number of "characteristic compounds", which are compounds that are characteristic of the dill seed plant and are therefore indicative of the inclusion of dill seed plant particles within the aerosol-generating substrate.

The amounts of the characteristic compounds present in pure dill seed particles are expected to be different from the amounts that are present in the aerosol-generating substrate. The process of making the substrate, which involves hydration in a slurry or suspension, and drying at elevated temperatures, as well as the presence of other ingredients, such as aerosol former, will differentially modify the amounts of each of the characteristic compounds. The integrity of the dill seed particles and the stability of a compound, under the temperature and subject to the manipulations during the manufacturing will also affect the final amount of the compound that is present in a substrate. It is therefore contemplated that the ratio of the characteristic compounds relative to each other would be different after the dill seed particles are incorporated into a substrate in various physical forms, e.g., sheets, strands and granules.

The presence of dill seed within an aerosol-generating substrate and the proportion of dill seed provided within an aerosol-generating substrate can be determined by measuring the amount of the characteristic compounds within the substrate and comparing this to the corresponding amount of the characteristic compound in pure dill seed material. The presence and amount of the characteristic compounds can be conducted using any suitable techniques, which would be known to the skilled person.

In a suitable technique, a sample of 250 milligrams of the aerosol-generating substrate is mixed with 5 millilitres of methanol and extracted by shaking, vortexing for 5 minutes and centrifuging (4500 g, 5 minutes, 10 degrees Celsius). Aliquots (300 microlitres) of the extract are transferred into a silanized chromatographic vial and diluted with methanol (600 microlitres) and internal standard (ISTD) solution (100 microlitres). The vials are closed and mixed for 5 minutes using an Eppendorf ThermoMixer (5 degrees Celsius; 2000 rpm). Test samples from the resultant extract are analysed by LC-HRAM-MS in combined full scan mode and data dependent fragmentation mode for identification of the characteristic compounds.

In some embodiments, the homogenised dill seed material further comprises up to about 75 percent by weight of tobacco particles, on a dry weight basis.

For example, the homogenised dill seed material preferably comprises between about 10 percent and about 75 percent by weight tobacco particles, more preferably between about 15 percent and about 70 percent by weight tobacco particles, more preferably between about 20 percent and about 65 percent by weight tobacco particles, more preferably between about 25 percent and about 60 percent by weight tobacco particles, more preferably between about 30 percent and about 70 percent by weight tobacco particles, on a dry weight basis.

In some preferred embodiments, the homogenised dill seed material comprises between about 5 percent and about 20 percent by weight of dill seed particles and between about 55 percent and about 70 percent by weight of tobacco particles, on a dry weight basis.

In aerosol-generating articles according to the first preferred embodiment of the invention, as defined above, the homogenised dill seed material preferably comprises between about 40 percent and about 75 percent by weight of tobacco particles, more preferably between about 45 percent and about 70 percent by weight of tobacco particles, more preferably between about 50 percent and about 65 percent by weight of tobacco particles, on a dry weight basis. For example, the homogenised dill seed material according to the first embodiment may comprise between about 5 percent and about 20 percent by weight of dill seed particles and between about 55 percent and about 70 percent by weight of tobacco particles, on a dry weight basis.

In aerosol-generating articles according to the second preferred embodiment of the invention, as defined above, the homogenised dill seed material preferably comprises between about 5 percent and about 65 percent by weight of tobacco particles, more preferably between about 10 percent and about 60 percent by weight of tobacco particles, more preferably between about 20 percent and about 55 percent by weight of tobacco particles, on a dry weight basis. For example, the homogenised dill seed material according to the second embodiment may comprise between about 2.5 percent and about 65 percent by weight of dill seed particles and between about 1 percent and about 65 percent by weight of tobacco particles, on a dry weight basis.

The weight ratio of the dill seed particles and the tobacco particles in the particulate plant material forming the homogenised dill seed material may vary depending on the desired flavour characteristics and composition of the aerosol. Preferably, the homogenised dill seed material comprises a weight ratio of dill seed particles to tobacco particles that is no more than 1:4. This means that the dill seed particles account for no more than 20 percent of the total particulate plant material. More preferably the homogenised dill seed material comprises a weight ratio of dill seed particles to tobacco particles that is no more than 1:5 and more preferably no more than 1:6.

For example, in a first preferred embodiment, the ratio by weight of dill seed particles to tobacco particles is about 1:4. A 1:4 ratio corresponds to a particulate plant material consisting of about 20 percent by weight dill seed particles and about 80 percent by weight tobacco particles. For homogenised dill seed material formed with about 75 percent by weight of particulate plant material, this corresponds to about 15 percent by weight of dill seed particles and about 60 percent by weight of tobacco particles in the homogenised dill seed material, based on dry weight.

In another embodiment, the homogenised dill seed material comprises a 1:9 weight ratio of dill seed particles to tobacco particles. In yet another embodiment, the homogenised dill seed material comprises a 1:30 weight ratio of dill seed particles to tobacco particles.

With reference to the present invention, the term "tobacco particles" describes particles of any plant member of the genus *Nicotiana*. The term "tobacco particles" encompasses ground or powdered tobacco leaf lamina, ground or powdered tobacco leaf stems, tobacco dust, tobacco fines, and other particulate tobacco by-products formed during the treating, handling and shipping of tobacco. In a preferred embodiment, the tobacco particles are substantially all derived from tobacco leaf lamina. By contrast, isolated nicotine and nicotine salts are compounds derived from tobacco but are not considered tobacco particles for purposes of the invention and are not included in the percentage of particulate plant material.

The tobacco particles may be prepared from one or more varieties of tobacco plants. Any type of tobacco may be used in a blend. Examples of tobacco types that may be used include, but are not limited to, sun-cured tobacco, flue-cured tobacco, Burley tobacco, Maryland tobacco, Oriental tobacco, Virginia tobacco, and other speciality tobaccos.

Flue-curing is a method of curing tobacco, which is particularly used with Virginia tobaccos. During the flue-curing process, heated air is circulated through densely packed tobacco. During a first stage, the tobacco leaves turn yellow and wilt. During a second stage, the laminae of the leaves are completely dried. During a third stage, the leaf stems are completely dried.

Burley tobacco plays a significant role in many tobacco blends. Burley tobacco has a distinctive flavour and aroma and also has an ability to absorb large amounts of casing.

Oriental is a type of tobacco which has small leaves, and high aromatic qualities. However, Oriental tobacco has a milder flavour than, for example, Burley. Generally, therefore, Oriental tobacco is used in relatively small proportions in tobacco blends.

Kasturi, Madura and Jatim are subtypes of sun-cured tobacco that can be used. Preferably, Kasturi tobacco and flue-cured tobacco may be used in a blend to produce the tobacco particles. Accordingly, the tobacco particles in the particulate plant material may comprise a blend of Kasturi tobacco and flue-cured tobacco.

The tobacco particles may have a nicotine content of at least about 2.5 percent by weight, based on dry weight. More preferably, the tobacco particles may have a nicotine content of at least about 3 percent, even more preferably at least about 3.2 percent, even more preferably at least about 3.5 percent, most preferably at least about 4 percent by weight, based on dry weight. When the aerosol-generating substrate contains tobacco particles in combination with dill seed particles, tobaccos having a higher nicotine content are preferred to maintain similar levels of nicotine relative to typical aerosol-generating substrates without dill seed particles, since the total amount of nicotine would otherwise be reduced due to substitution of tobacco particles with dill seed particles.

As a result of the inclusion of the tobacco particles, the aerosol-generating substrate and the aerosol generated from the aerosol-generating substrate of such embodiments comprise certain proportions of the "characteristic compounds" of tobacco. Characteristic compounds generated from tobacco include but are not limited to anatabine, cotinine, and damascenone.

Nicotine may optionally be incorporated into the aerosol-generating substrate although this would be considered as a non-tobacco material for the purposes of the invention. The nicotine may comprise one or more nicotine salts selected from the list consisting of nicotine lactate, nicotine citrate, nicotine pyruvate, nicotine bitartrate, nicotine benzoate, nicotine pectate, nicotine alginate, and nicotine salicylate. Nicotine may be incorporated in addition to a tobacco with low nicotine content, or nicotine may be incorporated into an aerosol-generating substrate that has a reduced or zero tobacco content.

In certain embodiments of the invention, the aerosol-generating substrate comprises a homogenised dill seed material formed from particulate plant material consisting of dill seed particles only, with nicotine, such as a nicotine salt, incorporated into the aerosol-generating substrate.

Preferably, the aerosol-generating substrate comprises at least about 0.1 mg of nicotine per gram of the substrate, on a dry weight basis. More preferably, the aerosol-generating substrate comprise at least about 0.5 mg of nicotine per gram of the substrate, more preferably at least about 1 mg of nicotine per gram of the substrate, more preferably at least about 1.5 mg of nicotine per gram of the substrate, more preferably at least about 2 mg of nicotine per gram of the substrate, more preferably at least about 3 mg of nicotine per gram of the substrate, more preferably at least about 4 mg of nicotine per gram of the substrate, more preferably at least about 5 mg of nicotine per gram of the substrate, on a dry weight basis.

Preferably, the aerosol-generating substrate comprises up to about 50 mg of nicotine per gram of the substrate, on a dry weight basis. More preferably, the aerosol-generating substrate comprises up to about 45 mg of nicotine per gram of the substrate, more preferably up to about 40 mg of nicotine per gram of the substrate, more preferably up to about 35 mg of nicotine per gram of the substrate, more preferably up to about 30 mg of nicotine per gram of the substrate, more preferably up to about 25 mg of nicotine per gram of the substrate, more preferably up to about 20 mg of nicotine per gram of the substrate, on a dry weight basis.

For example, the aerosol-generating substrate may comprise between about 0.1 mg and about 50 mg of nicotine per gram of the substrate, or between about 0.5 mg and about 45 mg of nicotine per gram of the substrate, or between about 1 mg and about 40 mg of nicotine per gram of the substrate, or between about 2 mg and about 35 mg of nicotine per gram of the substrate, or between about 5 mg and about 30 mg of nicotine per gram of the substrate, or between about 10 mg and about 25 mg of nicotine per gram of the substrate, or between about 15 mg and about 20 mg of nicotine per gram of the substrate, on a dry weight basis. In certain preferred embodiments of the invention, the aerosol-generating substrate comprises between about 1 mg and about 20 mg of nicotine per gram of the substrate, on a dry weight basis.

The defined ranges of nicotine content for the aerosol-generating substrate include all forms of nicotine which may be present in the aerosol-generating substrate, including nicotine intrinsically present in tobacco material as well as nicotine that has optionally been added separately to the aerosol-generating substrate, for example, in the form of a nicotine salt.

Alternatively or in addition to the inclusion of tobacco particles into the homogenised dill seed material of the aerosol-generating substrate according to the invention, the homogenised dill seed material may comprise up to 75 percent by weight of *cannabis* particles, on a dry weight basis. The term "*cannabis* particles" refers to particles of a *cannabis* plant, such as the species *Cannabis sativa, Cannabis indica*, and *Cannabis ruderalis*.

For example, the particulate plant material may comprises between about 40 percent and about 75 percent by weight of *cannabis* particles, more preferably between about 45 percent and about 60 percent by weight tobacco particles, more preferably between about 50 percent and about 65 percent by weight tobacco particles, on a dry weight basis.

One or more cannabinoid compounds may optionally be incorporated into the aerosol-generating substrate although this would be considered as a non-*cannabis* material for the purposes of the invention. As used herein with reference to the invention, the term "cannabinoid compound" describes any one of a class of naturally occurring compounds that are found in parts of the *cannabis* plant—namely the species *Cannabis sativa, Cannabis indica*, and *Cannabis ruderalis*. Cannabinoid compounds are especially concentrated in the female flower heads and commonly sold as *cannabis* oil. Cannabinoid compounds naturally occurring the in *cannabis* plant include tetrahydrocannabinol (THC) and cannabidiol (CBD). In the context of the present invention, the term "cannabinoid compounds" is used to describe both naturally derived cannabinoid compounds and synthetically manufactured cannabinoid compounds.

For example, the aerosol-generating substrate may comprise a cannabinoid compound selected from the group consisting of: tetrahydrocannabinol (THC), tetrahydrocannabinolic acid (THCA), cannabidiol (CBD), cannabidiolic acid (CBDA), cannabinol (CBN), cannabigerol (CBG), cannabigerol monomethyl ether (CBGM), cannabivarin (CBV), cannabidivarin (CBDV), tetrahydrocannabivarin (THCV), cannabichromene (CBC), cannabicyclol (CBL), cannabichromevarin (CBCV), cannabigerovarin (CBGV), cannabielsoin (CBE), cannabicitran (CBT) and combinations thereof.

The homogenised dill seed material may further comprise a proportion of other plant flavour particles in addition to the dill seed particles or the combination of dill seed particles with at least one of tobacco particles and *cannabis* particles (the "particulate plant material").

For the purposes of the present invention, the term "other plant flavour particles" refers to particles of non-dill seed, non-tobacco and non-*cannabis* plant material, that are capable of generating one or more flavourants upon heating. This term should be considered to exclude particles of inert plant material such as cellulose, that do not contribute to the sensory output of the aerosol-generating substrate. The particles may be derived from ground or powdered leaf lamina, fruits, stalks, stems, roots, seeds, buds or bark from the other plants. Suitable plant flavour particles for inclusion in an aerosol-generating substrate according to the invention would be known to the skilled person and include but are not limited to clove particles and tea particles.

The composition of the homogenised dill seed material can advantageously be adjusted through the blending of desired amounts and types of the different plant particles. This enables an aerosol-generating substrate to be formed from a single homogenised dill seed material, if desired, without the need for the combination or mixing of different blends, as is the case for example in the production of conventional cut filler. The production of the aerosol-generating substrate can therefore potentially be simplified.

The particulate plant material used in the aerosol-generating substrates of the present invention may be adapted to provide a desired particle size distribution. Particle size distributions herein are stated as D-values, whereby the D-value refers to the percentage of particles by number that has a diameter of less than or equal to the given D-value. For instance, in a D95 particle size distribution, 95 percent of the particles by number are of a diameter less than or equal to the given D95 value, and 5 percent of the particles by number are of a diameter measuring greater than the given D95 value. Similarly, in a D5 particle size distribution, 5 percent of the particles by number are of a diameter less than or equal to the D5 value, and 95 percent of the particles by number are of a diameter greater than the given D5 value. In combination, the D5 and D95 values therefore provide an indication of the particle size distribution of the particulate plant material.

The particulate plant material may have a D95 value of from greater than or equal to 200 microns to a D95 value of less than or equal to 1000 microns. By this is meant that the particulate plant material may be of a distribution represented by any D95 value within the given range, that is D95 may be equal to 200 microns, or D95 may be equal to 250 microns, etcetera, all the way up to D95 may be equal to 1000 microns. By providing a D95 value within this range, the inclusion of relatively large plant particles into the homogenised dill seed material is avoided. This is desirable, since the generation of aerosol from such large plant particles is likely to be relatively inefficient. Furthermore, the inclusion of large plant particles in the homogenised dill seed material may adversely impact the consistency of the material.

Preferably the particulate plant material may have a D95 value of from greater than or equal to about 200 microns to a D95 value of less than or equal to about 900 microns, more preferably a D95 value of from greater than or equal to about 300 microns to a D95 value of less than or equal to about 800 microns. The particulate dill seed material and the particulate tobacco material may both have D95 values of from greater than or equal to about 20 microns to D95 values of less than or equal to about 1000 microns, preferably D95 values of from greater than or equal to 200 microns to D95 values of less than or equal to about 900 microns, more preferably D95 values of from greater than or equal to about 300 microns to D95 values of less than or equal to about 800 microns.

Preferably, the particulate plant material may have a D5 value of from greater than or equal to about 10 microns to a D5 value of less than or equal to about 50 microns, more preferably a D5 value of from greater than or equal to about 20 microns to a D5 value of less than or equal to about 40 microns. By providing a D5 value within this range, the inclusion of very small dust particles into the homogenised dill seed material is avoided, which may be desirable from a manufacturing point of view.

In some embodiments, the particulate plant material may be purposely ground to form particles having the desired particle size distribution. The use of purposely ground plant material advantageously improves the homogeneity of the particulate plant material and the consistency of the homogenised dill seed material.

The diameter of 100 percent of the particulate plant material may be less than or equal to about 2000 microns, more preferably less than or equal to about 1500 microns. The diameter of 100 percent of the particulate dill seed material and 100 percent of the particulate tobacco material may be less than or equal to about 2000 microns, more preferably less than or equal to about 1500 microns. The particle size range of the dill seed particles enables dill seed particles to be combined with tobacco particles in existing cast leaf processes.

The homogenised dill seed material preferably comprises at least about 55 percent by weight of the particulate plant material including dill seed particles, as described above, more preferably at least about 60 percent by weight of the particulate plant material and more preferably at least about 65 percent by weight of the particulate plant material, on a dry weight basis. The homogenised dill seed material preferably comprises no more than about 95 percent by weight of the particulate plant material, more preferably no more than about 90 percent by weight of the particulate plant material and more preferably no more than about 85 percent by weight of the particulate plant material, on a dry weight basis. For example, the homogenised dill seed material may comprise between about 55 percent and about 95 percent by weight of the particulate plant material, or between about 60 percent and about 90 percent by weight of the particulate plant material, or between about 65 percent and about 85 percent by weight of the particulate plant material, on a dry weight basis. In one particularly preferred embodiment, the homogenised dill seed material comprises about 75 percent by weight of the particulate plant material, on a dry weight basis.

Preferably, in the homogenised dill seed material of the first preferred embodiment, as described above, the total weight amount particulate plant material is no more than about 75 percent by weight on a dry weight basis.

Preferably, in the homogenised dill seed material of the second preferred embodiment, as described above, the total weight amount of particulate plant material is no more than about 75 percent by weight on a dry weight basis, or no more than about 65 percent by weight on a dry weight basis.

The particulate plant material is therefore combined with one or more other components to form the homogenised dill seed material.

As defined above, the homogenised dill seed material further comprises an aerosol former. Upon volatilisation, an aerosol former can convey other vaporised compounds released from the aerosol-generating substrate upon heating, such as nicotine and flavourants, in an aerosol. The aerosolisation of a specific compound from an aerosol-generating substrate is determined not solely by its boiling point. The quantity of a compound that is aerosolised can be affected by the physical form of the substrate, as well as by the other components that are also present in the substrate. The stability of a compound under the temperature and time frame of aerosolisation will also affect the amount of the compound that is present in an aerosol.

Suitable aerosol formers for inclusion in the homogenised dill seed material are known in the art and include, but are not limited to: polyhydric alcohols, such as triethylene glycol, propylene glycol, 1,3-butanediol and glycerol; esters of polyhydric alcohols, such as glycerol mono-, di- or triacetate; and aliphatic esters of mono-, di- or polycarboxylic acids, such as dimethyl dodecanedioate and dimethyl tetradecanedioate. The homogenised dill seed material may comprise a single aerosol former, or a combination of two or more aerosol formers.

If the substrate is intended for use in an aerosol-generating article for an electrically-operated aerosol-generating system having a heating element, the aerosol former is preferably glycerol.

The amount of aerosol former may be adapted depending on the composition of the homogenised dill seed material, such as the type or amount of the plant particles, in order to achieve an aerosol having the desired levels of flavour compounds from the plant particles. The amount of aerosol former may also be adapted depending on the way in which it is intended to heat the aerosol-generating substrate during use and in particular, the temperature to which the aerosol-generating substrate will be heated during heating of the aerosol-generating article in an associated aerosol-generating device.

The homogenised dill seed material preferably has an aerosol former content of between about 5 percent and about 55 percent by weight on a dry weight basis, such as between about 10 percent and about 45 percent by weight on a dry weight basis, or between about 15 percent and about 40 percent by weight on a dry weight basis.

The aerosol former content may be between about 5 percent and about 30 percent by weight, on a dry weight basis. For example, in homogenised dill seed materials according to the first preferred embodiment of the invention, as defined above, the aerosol former content is preferably between about 5 percent and about 30 percent by weight, more preferably between about 10 percent and about 25 percent by weight, more preferably between about 15 percent and about 20 percent by weight on a dry weight basis.

Alternatively, the aerosol former content may be between about 15 percent and about 55 percent by weight, on a dry weight basis. For example, in homogenised dill seed materials according to the second preferred embodiment of the invention, as defined above, the aerosol former content is preferably between about 15 percent and about 55 percent by weight, more preferably between about 25 percent and about 50 percent by weight, more preferably between about 35 percent and about 45 percent by weight on a dry weight basis.

In other embodiments, the homogenised dill seed material may have an aerosol former content of about 1 percent to about 5 percent by weight on a dry weight basis. For example, if the substrate is intended for use in an aerosol-generating article in which aerosol former is kept in a reservoir separate from the substrate, the substrate may have an aerosol former content of greater than 1 percent and less than about 5 percent. In such embodiments, the aerosol former is volatilised upon heating and a stream of the aerosol former is contacted with the aerosol-generating substrate so as to entrain the flavours from the aerosol-generating substrate in the aerosol.

The aerosol former may act as a humectant in the aerosol-generating substrate.

As defined above, the homogenised dill seed material further comprises a binder to alter the mechanical properties of the particulate plant material, wherein the binder is included in the homogenised dill seed material during manufacturing as described herein. Suitable exogenous binders would be known to the skilled person and include but are not limited to: gums such as, for example, guar gum, xanthan gum, arabic gum and locust bean gum; cellulosic binders, for example, cellulose ethers such as hydroxypropyl cellulose, carboxymethyl cellulose (CMC), hydroxyethyl cellulose, methyl cellulose and ethyl cellulose; polysaccharides such as, for example, starches, organic acids, such as alginic acid, conjugate base salts of organic acids, such as sodium-alginate, agar and pectins; and combinations thereof. Preferably, the binder comprises guar gum.

Preferably, the binder is present in an amount of from about 1 percent to about 10 percent by weight, preferably in an amount of from about 2 percent to about 9 percent by weight, more preferably in amount of between about 3 percent by weight and about 8 percent by weight, on a dry weight basis.

In certain embodiments, the homogenised dill seed material preferably comprises between about 1 percent and about 10 percent by weight of binder, on a dry weight basis, wherein the binder is most preferably guar gum. For example, in aerosol-generating articles according to the first preferred embodiment of the invention, as defined above, the homogenised dill seed material preferably comprises between about 1 percent and about 10 percent by weight of binder, on a dry weight basis, wherein the binder is most preferably guar gum. For example, the homogenised dill seed material of the first preferred embodiment may comprise between about 2.5 percent by weight and about 25 percent by weight of dill seed particles, between about 5 percent by weight and about 30 percent by weight of aerosol former and between about 1 percent by weight and about 10 percent by weight of binder.

In certain embodiments, the homogenised dill seed material preferably comprises between about 2 percent and about 10 percent by weight of binder, on a dry weight basis, wherein the binder is most preferably cellulose ether. For example, in the aerosol-generating articles according to the second preferred embodiment, as defined above, the homogenised dill seed material preferably comprises between about 2 percent and about 10 percent by weight of binder, on a dry weight basis, wherein the binder is preferably cellulose ether. Particularly preferably, the binder is carboxymethyl cellulose (CMC). For example, the homogenised dill seed material of the second preferred embodiment may comprise between about 2.5 percent by weight and about 65 percent by weight of dill seed particles, between about 15 percent by weight and about 55 percent by weight of aerosol former and between about 2 percent by weight and about 10 percent by weight of cellulose ether.

In addition, the homogenised dill seed material of any embodiment may optionally further comprise additional cellulose. For example, the homogenised dill seed material may comprise between about 5 percent by weight and about 50 percent by weight of additional cellulose.

As used herein, the term "additional cellulose" encompasses any cellulosic material incorporated into the homogenised dill seed material which does not derive from the dill seed particles or tobacco particles provided in the homogenised dill seed material. The additional cellulose is therefore incorporated in the homogenised dill seed material in addition to the dill seed plant material or tobacco material, as a separate and distinct source of cellulose to any cellulose intrinsically provided within the dill seed particles or tobacco particles. The additional cellulose will typically derive from a different plant to the dill seed particles or tobacco particles. Preferably, the additional cellulose is in the form of an inert cellulosic material, which is sensorially inert and therefore does not substantially impact the organoleptic characteristics of the aerosol generated from the aerosol-generating substrate. For example, the additional cellulose is preferably a tasteless and odourless material.

The additional cellulose may consist of one type of cellulose material, or may be a combination of different types of cellulose material which provide different properties, as described in more detail below.

The additional cellulose incorporated in the homogenised dill seed material forming the aerosol-generating substrate of aerosol-generating articles according to the present invention is thought to provide additional structure and reinforcement to bind and support the plant particles and aerosol former within the homogenised material.

The incorporation of additional cellulose has been found to be particularly beneficial in homogenised dill seed materials in which the binder comprises cellulose ether, as described above. The combination of cellulose ether and additional cellulose material, at certain defined levels and within defined ratios, as set out below, has been advantageously found to provide a homogenised dill seed material having an improved tensile strength and homogeneity.

Using certain types of binder material, it may be technically difficult to produce a homogenised dill seed material having an acceptable tensile strength when the proportion of dill seed particles is above a certain level. With some binder materials, above a threshold level of the dill seed particles, the homogenised dill seed material has been found to have a low tensile strength and to have an inhomogeneous texture. If the tensile strength of the homogenised dill seed material is too low, it is fragile and cannot be processed effectively to form an aerosol-generating substrate, in particular on an industrial scale.

The inventors of the present application have discovered that by using the specific combination of cellulose ether and additional cellulose in the homogenised dill seed material, as defined above, a more effective binding effect of the dill seed particles can be achieved and the resulting homogenised dill seed material has a significantly higher tensile strength. The resultant homogenised dill seed material can therefore be readily processed to form an aerosol-generating substrate, using existing high speed apparatus and techniques.

Preferably, the ratio of additional cellulose material to cellulose ether in the homogenised dill seed material is at least 2.

Preferably, the additional cellulose comprises cellulose powder. The term "cellulose powder" is used herein to refer to a refined cellulose material in powder form that has been derived from cellulose fibers. Preferably, the cellulose powder is formed of particles with an average particle size of less than 100 microns. The cellulose powder may be in the form of microcrystalline cellulose. A suitable cellulose powder for use in the present invention is available as Microcrystalline Cellulose Type SK-105 or SK-101, or Cellulose Powder Type M-60 from Gumix International, Inc. of New Jersey.

Preferably, the amount of cellulose powder corresponds to at least about 5 percent by weight of the homogenised dill seed material, more preferably at least about 6 percent by weight of the homogenised dill seed material, more preferably at least about 7 percent by weight homogenised dill seed material and more preferably at least about 8 percent by weight homogenised dill seed t material, on a dry weight basis.

The amount of cellulose powder may be adapted above this minimum level depending upon the weight amount of the other components within the homogenised dill seed material and in particular, depending upon the weight amount of the plant particles. In certain embodiments, the cellulose powder may replace a proportion of the plant particles within the homogenised dill seed material, without a significant impact on the characteristics of the aerosol generated.

Preferably, the amount of cellulose powder corresponds to no more than about 45 percent by weight of the homogenised dill seed material, more preferably no more than about 40 percent by weight of the homogenised dill seed material, on a dry weight basis.

In certain embodiments, for example, embodiments having a relatively high level of particulate plant material in the homogenised dill seed material, the amount of cellulose powder may be relatively low. In such embodiments, the amount of cellulose powder may be between about 5 percent by weight and about 15 percent by weight of the homogenised dill seed material, or between about 6 percent by weight and about 12 percent by weight of the homogenised dill seed material, or between about 7 percent by weight and about 11 percent by weight of the homogenised dill seed material, or between about 8 percent by weight and about 10 percent by weight of the homogenised dill seed material, on a dry weight basis.

In other embodiments, for example, embodiments having a relatively low level of particulate plant material in the homogenised dill seed material, the amount of cellulose powder may be relatively high. In such embodiments, the amount of cellulose powder may be between about 15 percent by weight and about 45 percent by weight of the homogenised dill seed material, or between about 20 percent by weight and about 40 percent by weight of the homogenised dill seed material, or between about 25 percent by weight and about 35 percent by weight of the homogenised dill seed material, on a dry weight basis.

Preferably, where the homogenised dill seed material comprises cellulose ether and cellulose powder, the ratio by weight of cellulose powder to cellulose ether in the homogenised plant material is at least about 1.5, i.e. the amount of cellulose powder is at least 1.5 times the amount of cellulose ether. More preferably, the ratio by weight of cellulose powder to cellulose ether in the homogenised dill seed material is at least about 1.6, more preferably at least about 1.8.

Alternatively or in addition to the cellulose powder, the additional cellulose may comprise cellulose fibers. The term "cellulose fibers" is used herein to refer to fibers obtained directly from plant-based materials, wherein each fiber has a length that is significantly greater than its width. The cellulose fibers preferably have a fiber length of at least 400 microns. Suitable cellulose fibers for use in the present invention include, for example, wood pulp fibers. A suitable source of cellulose fibers for use in the present invention is available as ECF Bleached Hardwood Kraft Pulp from Storaenso, Sweden.

The cellulose fibers may advantageously act as mechanical reinforcement in the homogenised dill seed material forming the aerosol-generating substrate of aerosol-generating articles according to the invention. The cellulose fibers may improve the binding of the plant particles in the homogenised dill seed material and provide an improvement in tensile strength, in particular when combined with a cellulose ether binder.

Preferably, the amount of cellulose fibers corresponds to at least about 3 percent by weight of the homogenised dill seed material, based on dry weight, more preferably at least about 4 percent by weight of the homogenised dill seed material, more preferably at least about 5 percent by weight homogenised dill seed material and more preferably at least about 6 percent by weight homogenised dill seed material, on a dry weight basis.

Preferably, the amount of cellulose fibers corresponds to no more than about 12 percent by weight of the homogenised dill seed material, more preferably at least about 11 percent by weight of the homogenised dill seed material, more preferably at least about 10 percent by weight of the homogenised dill seed material, more preferably at least about 8 percent by weight of the homogenised dill seed material, on a dry weight basis.

For example, the homogenised dill seed material may comprise between about 3 percent by weight and about 12 percent by weight of cellulose fibers, or between about 4 percent by weight and about 11 percent by weight of cellulose fibers, or between about 5 percent by weight and about 10 percent by weight of cellulose fibers, or between about 6 percent by weight and about 8 percent by weight of cellulose fibers, on a dry weight basis.

Preferably, where the homogenised dill seed material comprises cellulose ether and cellulose fibers, the ratio by weight of cellulose fibers to cellulose ether in the homogenised dill seed material is at least about 0.5, i.e. the amount of cellulose powder is at least half the amount of cellulose ether. More preferably, the ratio by weight of cellulose fibers to cellulose ether in the homogenised dill seed material is at least about 0.75, more preferably at least about 1.

In preferred embodiments, the additional cellulose comprises cellulose powder and cellulose fibers. In such embodiments, the ratio by weight of cellulose powder to cellulose fibers is preferably at least about 1.5, more preferably at least about 1.75, more preferably at least about 2.

Preferably, the amount of additional cellulose provided in the homogenised dill seed material is adapted such that the total amount of additional cellulose and plant particles corresponds to no more than 75 percent by weight of the homogenised dill seed material. Preferably, at least about 25 percent by weight of the homogenised dill seed material is therefore provided by other components, including the cellulose ether and aerosol former.

In the aerosol-generating articles according to the second preferred embodiment of the present invention, the homogenised dill seed material preferably comprises between about 2 percent and about 10 percent by weight of cellulose ether and between about 5 percent by weight and about 50 percent by weight of additional cellulose, on a dry weight basis. Preferably, the ratio of the additional cellulose to cellulose ether is at least 2.

For example, a homogenised dill seed material according to the second preferred embodiment of the present invention may comprise: between 2.5 percent by weight and 75 percent by weight of dill seed particles, on a dry weight basis; between 15 percent by weight and 55 percent by weight of aerosol former, on a dry weight basis; between 2 percent by weight and 10 percent by weight of cellulose ether, on a dry weight basis; and between 3 percent by weight and 50 percent by weight of additional cellulose, on a dry weight basis. Such a homogenised dill seed material preferably further comprises at least 1 percent by weight of tobacco particles, on a dry weight basis.

In addition to the components described above, the homogenised dill seed material may optionally further comprise one or more lipids to facilitate the diffusivity of volatile components (for example, aerosol formers, (E)-anethole and nicotine), wherein the lipid is included in the homogenised plant material during manufacturing as described herein. Suitable lipids for inclusion in the homogenised dill seed material include, but are not limited to: medium-chain triglycerides, cocoa butter, palm oil, palm kernel oil, mango oil, shea butter, soybean oil, cottonseed oil, coconut oil, hydrogenated coconut oil, candellila wax, carnauba wax, shellac, sunflower wax, sunflower oil, rice bran, and Revel A; and combinations thereof.

Alternatively or in addition, the homogenised dill seed material may further comprise a pH modifier.

Alternatively or in addition, the homogenised dill seed material may further comprise fibers to alter the mechanical properties of the homogenised dill seed material, wherein the fibers are included in the homogenised dill seed material during manufacturing as described herein. Suitable exogenous fibers for inclusion in the homogenised dill seed material are known in the art and include fibers formed from non-tobacco material and non-dill seed material, including but not limited to: cellulose fibers; soft-wood fibers; hard-wood fibers; jute fibers and combinations thereof. Exogenous fibers derived from tobacco and/or dill seed can also be added. Any fibers added to the homogenised dill seed material are not considered to form part of the "particulate plant material" as defined above. Prior to inclusion in the homogenised dill seed material, fibers may be treated by suitable processes known in the art including, but not limited to: mechanical pulping; refining; chemical pulping; bleaching; sulphate pulping; and combinations thereof. A fiber typically has a length greater than its width.

Suitable fibers typically have lengths of greater than 400 micrometres and less than or equal to 4 mm, preferably within the range of 0.7 mm to 4 mm. Preferably, the fibers are present in an amount of at least about 2 percent by weight, based on the dry weight of the substrate. The amount of fibers in the homogenised dill seed material may depend upon the type of material and in particular, the method that is used to produce the homogenised dill seed material. In some embodiments, the fibers may be present in an amount of between about 2 percent by weight and about 15 percent by weight, most preferably at about 4 percent by weight, based on the dry weight of the substrate. For example, this level of fibers may be present where the homogenised plant material is in the form of cast leaf. In other embodiments, the fibers may be present in an amount of at least about 30 percent by weight, or at least about 40 percent by weight. For example, this higher level of fibers is likely to be provided where the homogenised dill seed material is a dill seed paper formed in a papermaking process.

In preferred embodiments of the invention, the homogenised dill seed material comprises dill seed particles, between about 5 percent by weight and about 30 percent by weight of aerosol former and between about 1 percent by weight and about 10 percent by weight of binder, on a dry weight basis. In such embodiments, the homogenised dill seed material preferably further comprises between about 2 percent by weight and about 15 percent by weight of fibers. Particularly preferably, the binder is guar gum.

The homogenised plant material of the aerosol-generating substrate according to the invention may comprises a single type of homogenised plant material or two or more types of homogenised plant material having a different composition or form to each other. For example, in one embodiment, the aerosol-generating substrate comprises dill seed particles and tobacco particles or *cannabis* particles contained within the same sheet of homogenised plant material. However, in other embodiments, the aerosol-generating substrate may comprise tobacco particles or *cannabis* particles and dill seed particles within different sheets to each other.

The homogenised dill seed material is preferably in the form of a solid or a gel. However, in some embodiments the homogenised material may be in the form of a solid that is not a gel. Preferably, the homogenised material is not in the form of a film.

The homogenised dill seed material can be provided in any suitable form. For example, the homogenised dill seed material may be in the form of one or more sheets. As used herein with reference to the invention, the term "sheet" describes a laminar element having a width and length substantially greater than the thickness thereof.

Alternatively or in addition, the homogenised dill seed material may be in the form of a plurality of pellets or granules.

Alternatively or in addition, the homogenised dill seed material may be in a form that can fill a cartridge or a shisha consumable, or that can be used in a shisha device. The invention includes a cartridge or a shisha device that contains a homogenised dill seed material.

Alternatively or in addition, the homogenised dill seed material may be in the form of a plurality of strands, strips or shreds. As used herein, the term "strand" describes an elongate element of material having a length that is substantially greater than the width and thickness thereof. The term "strand" should be considered to encompass strips, shreds and any other homogenised dill seed material having a similar form. The strands of homogenised dill seed material may be formed from a sheet of homogenised dill seed material, for example by cutting or shredding, or by other methods, for example, by an extrusion method.

In some embodiments, the strands may be formed in situ within the aerosol-generating substrate as a result of the splitting or cracking of a sheet of homogenised dill seed material during formation of the aerosol-generating substrate, for example, as a result of crimping. The strands of homogenised dill seed material within the aerosol-generating substrate may be separate from each other. Alternatively, each strand of homogenised dill seed material within the aerosol-generating substrate may be at least partially connected to an adjacent strand or strands along the length of the strands. For example, adjacent strands may be connected by one or more fibers. This may occur, for example, where the strands have been formed due to the splitting of a sheet of homogenised dill seed material during production of the aerosol-generating substrate, as described above.

Preferably, the aerosol-generating substrate is in the form of one or more sheets of homogenised dill seed material. In various embodiments of the invention, the one or more sheets of homogenised dill seed material may be produced by a casting process. In various embodiments of the invention, the one or more sheets of homogenised dill seed material may be produced by a paper-making process. The one or more sheets as described herein may each individually have a thickness of between 100 micrometres and 600 micrometres, preferably between 150 micrometres and 300 micrometres, and most preferably between 200 micrometres and 250 micrometres. Individual thickness refers to the thickness of the individual sheet, whereas combined thickness refers to the total thickness of all sheets that make up the aerosol-generating substrate. For example, if the aerosol-generating substrate is formed from two individual sheets, then the combined thickness is the sum of the thickness of the two individual sheets or the measured thickness of the two sheets where the two sheets are stacked in the aerosol-generating substrate.

The one or more sheets as described herein may each individually have a grammage of between about 100 $g/m^2$ and about 300 $g/m^2$.

The one or more sheets as described herein may each individually have a density of from about 0.3 $g/cm^3$ to about 1.3 $g/cm^3$, and preferably from about 0.7 $g/cm^3$ to about 1.0 $g/cm^3$.

The term "tensile strength" is used throughout the specification to indicate a measure of the force required to stretch a sheet of homogenised dill seed material until it breaks. More specifically, the tensile strength is the maximum tensile force per unit width that the sheet material will withstand before breaking and is measured in the machine direction or cross direction of the sheet material. It is expressed in units of Newtons per meter of material (N/m). Tests for measuring the tensile strength of a sheet material are well known. A suitable test is described in the 2014 publication of the International Standard ISO 1924-2 entitled "Paper and Board—Determination of Tensile Properties—Part 2: Constant Rate of Elongation Method".

The materials and equipment required to conduct a test according to ISO 1924-2 are: a universal tensile/compression testing machine, Instron 5566, or equivalent; a tension load cell of 100 Newtons, Instron, or equivalent; two pneumatic action grips; a steel gauge block of 180±0.25 millimetres length (width: about 10 millimetres, thickness: about 3 millimetres); a double-bladed strip cutter, size 15±0.05× about 250 millimetres, Adamel Lhomargy, or equivalent; a scalpel; a computer running acquisition software, Merlin, or equivalent; and compressed air.

The sample is prepared by first conditioning the sheet of homogenised dill seed material for at least 24 hours at 22±2 degrees Celsius and 60±5% relative humidity before testing. A machine-direction or cross-direction sample is then cut to about 250×15±0.1 millimetres with the double-bladed strip cutter. The edges of the test pieces must be cut cleanly, so no more than three test specimens are cut at the same time.

The tensile/compression testing instrument is set up by installing the tension load cell of 100 Newtons, switching on the Universal Tensile/Compression Testing Machine and the computer, and selecting the measurement method predefined in the software, with a test speed set to 8 millimetres per minute. The tension load cell is then calibrated and the pneumatic action grips are installed. The test distance between the pneumatic action grips is adjusted to 180±0.5 millimetres by means of the steel gauge block, and the distance and force are set to zero.

The test specimen is then placed straight and centrally between the grips, and touching the area to be tested with fingers is avoided. The upper grip is closed and the paper strip hangs in the opened lower grip. The force is set to zero. The paper strip is then pulled lightly down and the lower grip is closed; the starting force must be between 0.05 and 0.20 Newtons. While the upper grip is moving upward, a gradually increasing force is applied until the test specimen breaks. The same procedure is repeated with the remaining test specimens. The result is valid when the test specimen breaks when the grips move apart by a distance of more than 10 millimetres. If it is not the case, the result is rejected and an additional measurement is performed.

Where the test specimen of homogenised dill seed material that is available is smaller than the described sample in the test according to ISO 1924-2, as set out above, the test can readily be scaled down to accommodate the available size of test specimen.

The one or more sheets of homogenised dill seed material as described herein may each individually have a tensile strength at peak in a cross direction of from 50 N/m to 400 N/m or preferably from 150 N/m to 350 N/m. Given that the sheet thickness affects the tensile strength, and where a batch of sheets exhibits variation in thickness, it may be desirable to normalize the value to a specific sheet thickness.

The one or more sheets as described herein may each individually have a tensile strength at peak in a machine direction of from 100 N/m to 800 N/m or preferably from 280 N/m to 620 N/m, normalized to a sheet thickness of 215 μm. The machine direction refers to the direction in which the sheet material would be rolled onto or unrolled from a bobbin and fed into a machine, while the cross direction is perpendicular to the machine direction. Such values of tensile strength make the sheets and methods described herein particularly suitable for subsequent operations involving mechanical stresses.

The provision of a sheet having the levels of thickness, grammage and tensile strength as defined above advantageously optimises the machinability of the sheet to form the aerosol-generating substrate and ensures that damage, such as tearing of the sheet, is avoided during high speed processing of the sheet.

In embodiments of the present invention in which the aerosol-generating substrate comprises one or more sheets of homogenised dill seed material, the sheets are preferably in the form of one or more gathered sheets. As used herein, the term "gathered" denotes that the sheet of homogenised dill seed material is convoluted, folded, or otherwise compressed or constricted substantially transversely to the cylindrical axis of a plug or a rod. The step of "gathering" the sheet may be carried out by any suitable means which provides the necessary transverse compression of the sheet.

As used herein, the term "longitudinal" refers to the direction corresponding to the main longitudinal axis of the aerosol-generating article, which extends between the upstream and downstream ends of the aerosol-generating article. During use, air is drawn through the aerosol-generating article in the longitudinal direction. The term "transverse" refers to the direction that is perpendicular to the longitudinal axis. As used herein, the term "length" refers to the dimension of a component in the longitudinal direction and the term "width" refers to the dimension of a component in the transverse direction. For example, in the case of a plug or rod having a circular cross-section, the maximum width corresponds to the diameter of the circle.

As used herein, the term "plug" denotes a generally cylindrical element having a substantially polygonal, circular, oval or elliptical cross-section. As used herein, the term "rod" refers to a generally cylindrical element of substantially polygonal cross-section and preferably of circular, oval or elliptical cross-section. A rod may have a length greater than or equal to the length of a plug. Typically, a rod has a length that is greater than the length of a plug. A rod may comprise one or more plugs, preferably aligned longitudinally.

As used herein, the terms "upstream" and "downstream" describe the relative positions of elements, or portions of elements, of the aerosol-generating article in relation to the direction in which the aerosol is transported through the aerosol-generating article during use. The downstream end of the airflow path is the end at which aerosol is delivered to a user of the article.

The one or more sheets of homogenised dill seed material may be gathered transversely relative to the longitudinal axis thereof and circumscribed with a wrapper to form a continuous rod or a plug. The continuous rod may be severed into a plurality of discrete rods or plugs. The wrapper may be a paper wrapper or a non-paper wrapper, as described in more detail below.

Alternatively, the one or more sheets of homogenised dill seed material may be cut into strands as referred to above. In such embodiments, the aerosol-generating substrate comprises a plurality of strands of the homogenised dill seed material. The strands may be used to form a plug. Typically, the width of such strands is at least about 0.2 mm, or at least about 0.5 mm. Preferably, the width of such strands is no more than about 5 mm, or about 4 mm, or about 3 mm, or about 1.5 mm. For example, the width of the strands may be between about 0.25 mm and about 5 mm, or between about 0.25 mm and about 3 mm, or between about 0.5 mm and about 1.5 mm.

The length of the strands is preferably greater than about 5 mm, for example, between about 5 mm to about 20 mm, or between about 8 mm to about 15 mm, or about 12 mm. Preferably, the strands have substantially the same length as each other. The length of the strands may be determined by the manufacturing process whereby a rod is cut into shorter plugs and the length of the strands corresponds to the length of the plug. The strands may be fragile which may result in breakage especially during transit. In such cases, the length of some of the strands may be less than the length of the plug.

The plurality of strands preferably extend substantially longitudinally along the length of the aerosol-generating substrate, aligned with the longitudinal axis. Preferably, the plurality of strands are therefore aligned substantially parallel to each other.

The strands of homogenised dill seed material preferably each have a mass to surface area ratio of at least about 0.02 milligrams per square millimetre, more preferably at least about 0.05 milligrams per square millimetre. Preferably the strands of homogenised dill seed material each have a mass to surface area ratio of no more than about 0.2 milligrams per square millimetre, more preferably no more than about 0.15 milligrams per square millimetre. The mass to surface area ratio is calculated by dividing the mass of the strand of homogenised dill seed material in milligrams by the geometric surface area of the strand of homogenised dill seed material in square millimetres.

The one or more sheets of homogenised dill seed material may be textured through crimping, embossing, or perforating. The one or more sheets may be textured prior to gathering or prior to being cut into strands. Preferably, the one or more sheets of homogenised dill seed material are crimped prior to gathering, such that the homogenised dill seed material may be in the form of a crimped sheet, more preferably in the form of a gathered crimped sheet. As used herein, the term "crimped sheet" denotes a sheet having a plurality of substantially parallel ridges or corrugations usually aligned with the longitudinal axis of the article.

In one embodiment, the aerosol-generating substrate may be in the form of a single plug of aerosol-generating substrate. Preferably, the plug of aerosol-generating substrate may comprise a plurality of strands of homogenised dill seed material. Most preferably, the plug of aerosol-generating substrate may comprise one or more sheets of homogenised dill seed material. Preferably, the one or more sheets of homogenised dill seed material may be crimped such that it has a plurality of ridges or corrugations substantially parallel to the cylindrical axis of the plug. This treatment advantageously facilitates gathering of the crimped sheet of homogenised dill seed material to form the plug. Preferably, the one or more sheets of homogenised dill seed material may be gathered. It will be appreciated that crimped sheets of homogenised dill seed material may alternatively or in addition have a plurality of substantially parallel ridges or corrugations disposed at an acute or obtuse angle to the cylindrical axis of the plug. The sheet may be crimped to such an extent that the integrity of the sheet becomes disrupted at the plurality of parallel ridges or corrugations causing separation of the material, and results in the formation of shreds, strands or strips of homogenised dill seed material.

In another embodiment of the aerosol-generating substrate, the homogenised plant material comprises a first plug comprising a first homogenised plant material and a second plug comprising a second homogenised plant material, wherein the first homogenised plant material and the second homogenised plant material comprise different levels of dill seed particles and tobacco particles. For example, the first homogenised plant material may comprise between about 50 percent and about 75 percent by weight of dill seed particles on a dry weight basis; and the second homogenised plant material comprises between about 50 percent and about 75 percent by weight of tobacco particles, on a dry weight basis. Overall, in accordance with the invention, the homogenised plant materials within the aerosol-generating substrate preferably comprise at least 2.5 percent by weight of dill seed particles and up to 70 percent by weight of tobacco particles, on a dry weight basis.

In such arrangements, the first homogenised plant material preferably comprises a first particulate plant material with a higher proportion of dill seed particles than the second homogenised plant material. The second homogenised plant material may be a homogenised tobacco material, with substantially no dill seed particles.

Preferably, the first homogenised plant material may be in the form of one or more sheets and the second homogenised plant material may be in the form of one or more sheets.

Optionally, the aerosol-generating substrate may comprise one or more plugs. Preferably, the substrate may comprise a first plug and a second plug, wherein the first homogenised plant material may be located in the first plug and the second homogenised plant material may be located in the second plug.

Two or more plugs may be combined in an abutting end-to-end relationship and extend to form a rod. Two plugs may be placed longitudinally with a gap between them, thereby creating a cavity within a rod. The plugs may be in any suitable arrangement within the rod.

For instance, in a preferred arrangement, a downstream plug comprising a major proportion of dill seed particles may abut an upstream plug comprising a major proportion of tobacco particles to form the rod. The alternative configuration in which the upstream and downstream positions of the respective plugs are changed relative to one another is also envisaged. Alternative configurations in which a third homogenised plant material containing a different proportion of dill seed particles and tobacco particles and forming a third plug are also envisaged. Where two or more plugs are provided, the homogenised plant material may be provided in the same form in each plug or in a different form in each plug, that is, gathered or shredded. The one or more plugs may optionally be wrapped individually or together in a thermally conductive sheet material, as described below.

The first plug may comprise one or more sheets of the first homogenised plant material, and the second plug may comprise one or more sheets of the second homogenised plant material. The sum of the length of the plugs may be between about 10 mm and about 40 mm, preferably between about 10 and about 15 mm, more preferably about 12 mm. The first plug and the second plug may be of the same length or may have different lengths. If the first plug and the second plug have the same lengths, the length of each plug may be preferably from about 6 mm to about 20 mm. Preferably, the second plug may be longer than the first plug in order to provide a desired ratio of tobacco particles to dill seed particles in the substrate. Overall, preferably the substrate contains between 0 and 75 percent by weight of tobacco particles and between 2.5 and 75 percent by weight of dill seed particles, on a dry weight basis. Preferably the second plug is at least 40 percent to 50 percent longer than the first plug.

If the first homogenised plant material and the second homogenised plant material are in the form of one or more sheets, preferably the one or more sheets of the first homogenised plant material and second homogenised plant material may be gathered sheets. Preferably the one or more sheets of the first homogenised plant material and second homogenised plant material may be crimped sheets. It will be appreciated that all other physical properties described with reference to an embodiment in which a single homogenised plant material is present are equally applicable to an embodiment in which a first homogenised plant material and a second homogenised plant material are present. Further, it will be appreciated that the description of additives (such as binders, lipids, fibers, aerosol formers, humectants, plasticisers, flavourants, fillers, aqueous and non-aqueous solvents and combinations thereof) with reference to an embodiment in which a single homogenised plant material is present are equally applicable to an embodiment in which a first homogenised plant material and a second homogenised plant material are present.

In yet another embodiment of the aerosol-generating substrate, the first homogenised plant material is in the form of a first sheet, the second homogenised plant material is in the form of a second sheet, and the second sheet at least partially overlies the first sheet.

The first sheet may be a textured sheet and the second sheet may be non-textured.

Both the first and second sheets may be textured sheets.

The first sheet may be a textured sheet that is textured in a different way to the second sheet. For example, the first sheet may be crimped and the second sheet may be perforated. Alternatively, the first sheet may be perforated and the second sheet may be crimped.

Both the first and second sheets may be crimped sheets that are morphologically different from each other. For example, the second sheet may be crimped with a different number of crimps per unit width of sheet compared to the first sheet.

The sheets may be gathered to form a plug. The sheets that are gathered together to form the plug may have different physical dimensions. The width and thickness of the sheets may be varied.

It may be desirable to gather together two sheets each having a different thickness or each having a different width. This may alter the physical properties of the plug. This may facilitate the formation of a blended plug of aerosol-generating substrate from sheets of different chemical composition.

The first sheet may have a first thickness and the second sheet may have a second thickness that is a multiple of the first thickness, for example the second sheet may have a thickness two or three times the first thickness.

The first sheet may have a first width and the second sheet may have a second width that is different to the first width.

The first sheet and the second sheet may be disposed in overlapping relationship prior to being gathered together, or at the point at which they are gathered together. The sheets may have the same width and thickness. The sheets may have different thicknesses. The sheets may have different widths. The sheets may be differently textured.

Where it is desired that the first sheet and the second sheet are both textured, the sheets may be simultaneously textured prior to being gathered. For example, the sheets may be brought into overlapping relationship and passed through a texturing means, such as a pair of crimping rollers. A suitable apparatus and process for simultaneous crimping are described with reference to FIG. 2 of WO-A-2013/178766. In a preferred embodiment, the second sheet of the second homogenised plant material overlies the first sheet of the first homogenised plant material, and the combined sheets are gathered to form a plug of aerosol-generating substrate. Optionally, the sheets may be crimped together prior to gathering to facilitate gathering.

Alternatively, each sheet may be separately textured and then subsequently brought together to be gathered into a plug. For example, where the two sheets have a different thickness, it may be desirable to crimp the first sheet differently relative to the second sheet.

It will be appreciated that all other physical properties described with reference to an embodiment in which a single homogenised plant material is present are equally applicable to an embodiment in which a first homogenised plant material and a second homogenised plant material are present. Further, it will be appreciated that the description of additives (such as binders, lipids, fibers, aerosol formers, humectants, plasticisers, flavourants, fillers, aqueous and non-aqueous solvents and combinations thereof) with reference to an embodiment in which a single homogenised plant material is present are equally applicable to an embodiment in which a first homogenised plant material and a second homogenised plant material are present.

The homogenised plant material used in the aerosol-generating substrates according to the invention may be produced by various methods including paper making, casting, dough reconstitution, extrusion or any other suitable process.

Preferably, the homogenised dill seed material is in the form of "cast leaf". The term "cast leaf" is used herein to refer to a sheet product made by a casting process that is based on casting a slurry comprising plant particles (for example, dill seed particles, or tobacco particles and dill seed particles in a mixture) and a binder (for example, guar gum) onto a supportive surface, such as a belt conveyor, drying the slurry and removing the dried sheet from the supportive surface. An example of the casting or cast leaf process is described in, for example, U.S. Pat. No. 5,724,998 for making cast leaf tobacco. In a cast leaf process, particulate plant materials are mixed with a liquid component, typically water, to form a slurry. Other added components in the slurry may include fibers, a binder and an aerosol former. The particulate plant materials may be agglomerated in the presence of the binder. The slurry is cast onto a supportive surface and dried to form a sheet of homogenised dill seed material.

In certain preferred embodiments, the homogenised dill seed material used in articles according to the present invention is produced by casting. Homogenised dill seed material made by the casting process typically comprise agglomerated particulate plant material.

In a cast-leaf process, because substantially all the soluble fraction is kept within the plant material, most flavours are advantageously preserved. Additionally, energy-intensive paper-making steps are avoided.

In one preferred embodiment of the present invention, to form homogenised dill seed material, a mixture comprising particulate plant material, water, a binder, and an aerosol former is formed. A sheet is formed from the mixture, and the sheet is then dried. Preferably the mixture is an aqueous mixture. As used herein, "dry weight" refers to the weight of a particular non-water component relative to the sum of the weights of all non-water components in a mixture, expressed as a percentage. The composition of aqueous mixtures may be referred to by "percentage dry weight." This refers to the weight of the non-water components relative to the weight of the entire aqueous mixture, expressed as a percentage.

The mixture may be a slurry. As used herein, a "slurry" is a homogenised aqueous mixture with a relatively low dry weight. A slurry as used in the method herein may preferably have a dry weight of between 5 percent and 60 percent.

Alternatively, the mixture may be a dough. As used herein, a "dough" is an aqueous mixture with a relatively high dry weight. A dough as used in the method herein may preferably have a dry weight of at least 60 percent, more preferably at least 70 percent.

Slurries comprising greater than 30 percent dry weight and doughs may be preferred in certain embodiments of the present method.

The step of mixing the particulate plant material, water and other optional components may be carried out by any suitable means. For mixtures of a low viscosity, that is, some slurries, it is preferred that mixing is performed using a high energy mixer or a high shear mixer. Such mixing breaks down and distributes the various phases of the mixture homogeneously. For mixtures of a higher viscosity, that is, some doughs, a kneading process may be used to distribute the various phases of the mixture homogeneously.

Methods according to the present invention may further comprise the step of vibrating the mixture to distribute the various components. Vibrating the mixture, that is for example vibrating a tank or silo where a homogenised mixture is present, may help the homogenization of the mixture, particularly when the mixture is a mixture of low viscosity, that is, some slurries. Less mixing time may be required to homogenize a mixture to the target value optimal for casting if vibrating is performed as well as mixing.

If the mixture is a slurry, a web of homogenised dill seed material is preferably formed by a casting process comprising casting the slurry on a supportive surface, such as a belt conveyor. The method for production of a homogenised dill seed material comprises the step of drying said cast web to form a sheet. The cast web may be dried at room temperature or at an ambient temperature of at least about 60 degrees Celsius, more preferably at least about 80 degrees Celsius for a suitable length of time. Preferably, the cast web is dried at an ambient temperature of no more than 200 degrees Celsius, more preferably no more than about 160 degrees Celsius. For example, the cast web may be dried at a temperature of between about 60 degrees Celsius and about 200 degrees Celsius, or between about 80 degrees Celsius and about 160 degrees Celsius. Preferably, the moisture content of the sheet after drying is between about 5 percent and about 15 percent based on the total weight of the sheet. The sheet may then be removed from the supportive surface after drying. The cast sheet has a tensile strength such that it can be mechanically manipulated and wound or unwound from a bobbin without breakage or deformation.

If the mixture is a dough, the dough may be extruded in the form of a sheet, strands, or strips, prior to the step of drying the extruded mixture. Preferably, the dough may be extruded in the form of a sheet. The extruded mixture may be dried at room temperature or at a temperature of at least about 60 degrees Celsius, more preferably at least about 80 degrees Celsius for a suitable length of time. Preferably, the extruded mixture is dried at an ambient temperature of no more than 200 degrees Celsius, more preferably no more than about 160 degrees Celsius. For example, the extruded mixture may be dried at a temperature of between about 60 degrees Celsius and about 200 degrees Celsius, or between about 80 degrees Celsius and about 160 degrees Celsius. Preferably, the moisture content of the extruded mixture after drying is between about 5 percent and about 15 percent based on the total weight of the sheet. A sheet formed from dough requires less drying time and/or lower drying temperatures as a result of significantly lower water content relative to a web formed from a slurry.

After the sheet has been dried, the method may optionally comprise a step of coating a nicotine salt, preferably along with an aerosol former, onto the sheet, as described in the disclosure of WO-A-2015/082652.

After the sheet has been dried, methods according to the invention may optionally comprise a step of cutting the sheet into strands, shreds or strips for the formation of the aerosol-generating substrate as described above. The strands, shreds or strips may be brought together to form a rod of the aerosol-generating substrate using suitable means. In the formed rod of aerosol-generating substrate, the strands, shreds or strips may be substantially aligned, for example, in the longitudinal direction of the rod. Alternatively, the strands, shreds or strips may be randomly oriented in the rod.

Methods according to the present invention may optionally further comprise a step of winding the sheet onto a bobbin, after the drying step.

Alternatively, the homogenised dill seed material may be in the form of a dill seed paper. The present invention further provides an alternative paper-making method for producing sheets of homogenised plant material in the form of a plant "paper". Plant paper refers to a reconstituted plant sheet formed by a process in which a plant feedstock is extracted with a solvent to produce an extract of soluble plant compounds and an insoluble residue of fibrous plant material, and the extract is recombined with the insoluble residue. The extract may optionally be concentrated or further processed before being recombined with the insoluble residue. The insoluble residue may optionally be refined and combined with additional plant fibers before being recombined with the extract. In the method according to the present invention, the plant feedstock will comprise particles of dill seed, optionally in combination with particles of tobacco.

In more detail, the method of producing a plant paper comprises a first step of mixing a plant material and water to form a dilute suspension. The dilute suspension comprises mostly separate cellulose fibers. The suspension has a lower viscosity and a higher water content than the slurry produced in the casting process. This first step may involve soaking, optionally in the presence of an alkali, such as sodium hydroxide, and optionally applying heat.

The method further comprises a second step of separating the suspension into an insoluble portion containing the insoluble residue of fibrous plant material and a liquid or aqueous extract comprising soluble plant compounds. The water remaining in the insoluble residue of fibrous plant material may be drained through a screen, acting as a sieve, such that a web of randomly interwoven fibers may be laid down. Water may be further removed from this web by pressing with rollers, sometimes aided by suction or vacuum.

After removal of the aqueous portion and water, the insoluble residue is formed into a sheet. Preferably, a generally flat, uniform sheet of plant fibers is formed.

Preferably, the method further comprises the steps of concentrating the extract of soluble plant compounds that were removed from the sheet and adding the concentrated extract into the sheet of insoluble residue of fibrous plant material to form a sheet of homogenised plant material. Alternatively or in addition, a soluble plant substance or concentrated plant substance from another process can be added to the sheet. The extract or concentrated extract may be from another variety of the same species of plant, or from another species of plant.

This process, as described in U.S. Pat. No. 3,860,012, has been used with tobacco to make reconstituted tobacco products, also known as tobacco paper. The same process can also be used with one or more plants to produce a paper-like sheet material, such a sheet of dill seed paper.

In certain preferred embodiments, the homogenised plant material used in articles according to the present invention is produced by a paper-making process as defined above. Homogenised tobacco material or homogenised dill seed material produced by such a process are referred to as tobacco paper or dill seed paper. Homogenised plant material made by the paper-making process is distinguishable by the presence of a plurality of fibers throughout the material, visible by eye or under a light microscope, particularly when the paper is wetted by water. In material made by the casting process comprises less fibers than paper and tends to dissociate into a slurry when it is wetted. Mixed tobacco dill seed paper refers to homogenised plant material produced by such a process using a mixture of tobacco and dill seed materials.

In embodiments in which the aerosol-generating substrate comprises a combination of dill seed particles and tobacco particles, the aerosol-generating substrate may comprise one or more sheets of dill seed paper and one or more sheets of tobacco paper. The sheets of dill seed paper and tobacco paper may be interleaved with each other or stacked prior to being gathered to form a rod. Optionally, the sheets may be crimped. Alternatively, the sheets of dill seed paper and tobacco paper may be cut into strands, strips or shreds and then combined to form a rod. The relative amounts of tobacco and dill seed in the aerosol-generating substrate can be adjusted by changing the respective number of tobacco and dill seed sheets or the respective amounts of dill seed and tobacco strands, strips or shreds in the rod.

For example, the number or amount of tobacco and dill seed sheets or strands may be adjusted to provide a ratio of dill seed to tobacco of about 1:4, or about 1:9 or about 1:30.

Other known processes that can be applied to producing homogenised plant materials are dough reconstitution processes of the type described in, for example, U.S. Pat. No. 3,894,544; and extrusion processes of the type described in, for example, in GB-A-983,928. Typically, the densities of homogenised plant materials produced by extrusion processes and dough reconstitution processes are greater than the densities of the homogenised plant materials produced by casting processes.

Preferably, the aerosol-generating substrate of aerosol-generating articles according to the invention comprises at least about 200 mg of the homogenised plant material, more preferably at least about 250 mg of the homogenised plant material and more preferably at least about 300 mg of the homogenised plant material.

Aerosol-generating articles according to the invention comprise a rod, comprising the aerosol-generating substrate in one or more plugs. The rod of aerosol-generating substrate may have a length of from about 5 mm to about 120 mm. For example, the rod may preferably have a length of between about 10 and about 45 mm, more preferably between about 10 mm and 15 mm, most preferably about 12 mm. In alternative embodiments, the rod preferably has a length of between about 30 mm and about 45 mm, or between about 33 mm and about 41 mm. Where the rod is formed of a single plug of aerosol-generating substrate, the plug has the same length as the rod.

The rod of aerosol-generating substrate may have an external diameter of between about 5 mm and about 10 mm, depending on their intended use. For example, in some embodiments, the rod may have an external diameter of between about 5.5 mm and about 8 mm, or between about 6.5 mm and about 8 mm. The "external diameter of the rod of aerosol-generating substrate corresponds to the diameter of the rod including any wrappers.

The rod of aerosol-generating substrate of the aerosol-generating articles according to the invention is preferably circumscribed by one or more wrappers along at least a part of its length. The one or more wrappers may include a paper wrapper or a non-paper wrapper, or both. Suitable paper wrappers for use in specific embodiments of the invention are known in the art and include, but are not limited to: cigarette papers; and filter plug wraps. Suitable non-paper wrappers for use in specific embodiments of the invention are known in the art and include, but are not limited to sheets of homogenised tobacco materials. Homogenised tobacco wrappers are particularly suitable for use in embodiments wherein the aerosol-generating substrate comprises one or more sheets of homogenised dill seed material formed of particulate plant material, the particulate plant material containing dill seed particles in combination with a low percentage by weight of tobacco particles, such as from 20 percent to 0 percent by weight of tobacco particles, based on dry weight.

In certain embodiments of the invention, the aerosol-generating substrate is circumscribed along at least a part of its length by a thermally conductive sheet material, for example, a metallic foil, such as aluminium foil or a metallised paper. The metallic foil or metallised paper serves the purpose of conducting heat rapidly throughout the aerosol-generating substrate. In addition, the metallic foil or metallised paper may serve to prevent the ignition of the aerosol-generating substrate in the event that the consumer attempts to light it. Furthermore, during use, the metallic foil or metallised paper may prevent odours produced upon heating of the outer wrapper from entering the aerosol generated from the aerosol-generating substrate. For example, this may be a problem for aerosol-generating articles having an aerosol-generating substrate that is heated externally during use in order to generate an aerosol. Alternatively, or in addition, a metallised wrapper may be used to facilitate detection or recognition of the aerosol-generating article when it is inserted into an aerosol-generating device during use. The metallic foil or metallised paper may comprise metal particles, such as iron particles.

The one or more wrappers circumscribing the aerosol-generating substrate preferably have a total thickness of between about 0.1 mm and about 0.9 mm.

The internal diameter of the rod of aerosol-generating substrate is preferably between about 3 mm and about 9.5 mm, more preferably between about 4 mm and about 7.5 mm, more preferably between about 5 mm and about 7.5 mm. The "internal diameter" corresponds to the diameter of the rod of aerosol-generating substrate without including the thickness of the wrappers, but measured with the wrappers still in place. Aerosol-generating articles according to the invention also include but are not limited to a cartridge or a shisha consumable.

Aerosol-generating articles according to the invention may optionally comprise at least one hollow tube immediately downstream of the aerosol-generating substrate. One function of the tube is to locate the aerosol-generating substrate towards the distal end of the aerosol-generating article so that it can be contacted with a heating element. The tube acts to prevent the aerosol-generating substrate from being forced along the aerosol-generating article towards other downstream elements when a heating element is inserted into the aerosol-generating substrate. The tube also acts as a spacer element to separate the downstream elements from the aerosol-generating substrate. The tube can be made of any material, such as cellulose acetate, a polymer, cardboard, or paper.

Aerosol-generating articles according to the invention optionally comprise one or more of a spacer or an aerosol-cooling element downstream of the aerosol-generating substrate and immediately downstream of the hollow tube. In use, an aerosol formed by volatile compounds released from the aerosol-generating substrate passes through and is cooled by the aerosol-cooling element before being inhaled by a user. The lower temperature allows the vapours to condense into an aerosol. The spacer or aerosol-cooling element may be a hollow tube, such as a hollow cellulose acetate tube or a cardboard tube, which can be similar to the one that is immediately downstream of the aerosol-generating substrate. The spacer may be a hollow tube of equal outer diameter but smaller or larger inner diameter than the hollow cellulose acetate tube. In one embodiment, the aerosol-cooling element wrapped in paper comprises one or more longitudinal channels made of any suitable material, such as a metallic foil, a paper laminated with a foil, a polymeric sheet preferably made of a synthetic polymer, and a substantially non-porous paper or cardboard. In some embodiments, the aerosol-cooling element wrapped in paper may comprise one or more sheets made of a material selected from the group consisting of polyethylene (PE), polypropylene (PP), polyvinylchloride (PVC), polyethylene terephthalate (PET), polylactic acid (PLA), cellulose acetate (CA), paper laminated with a polymeric sheet and aluminium foil. Alternatively, the aerosol-cooling element may be made of woven or non-woven filaments of a material selected from the group consisting of polyethylene (PE), polypropylene (PP), polyvinylchloride (PVC), polyethylene terephthalate (PET), polylactic acid (PLA), and cellulose acetate (CA). In a preferred embodiment, the aerosol-cooling element is a crimped and gathered sheet of polylactic acid wrapped within a filter paper. In another preferred embodiment, the aerosol-cooling element comprises a longitudinal channel and is made of woven filaments of a synthetic polymer, such as polylactic acid filaments, which are wrapped in paper.

Aerosol-generating articles according to the invention may further comprise a filter or mouthpiece downstream of the aerosol-generating substrate and the hollow acetate tube, spacer or aerosol-cooling element. The filter may comprise one or more filtration materials for the removal of particulate components, gaseous components, or a combination thereof. Suitable filtration materials are known in the art and include, but are not limited to: fibrous filtration materials such as, for example, cellulose acetate tow and paper; adsorbents such as, for example, activated alumina, zeolites, molecular sieves and silica gel; biodegradable polymers including, for example, polylactic acid (PLA), Mater-Bi®, hydrophobic viscose fibers, and bioplastics; and combinations thereof. The filter may be located at the downstream end of the aerosol-generating article. The filter may be a cellulose acetate filter plug. The filter is about 7 mm in length in one embodiment, but may have a length of between about 5 mm and about 10 mm.

Aerosol-generating articles according to the invention may comprise a mouth end cavity at the downstream end of the article. The mouth end cavity may be defined by one or more wrappers extending downstream from the filter or mouthpiece. Alternatively, the mouth end cavity may be defined by a separate tubular element provided at the downstream end of the aerosol-generating article.

Aerosol-generating articles according to the invention preferably further comprise a ventilation zone provided at a location along the aerosol-generating article. For example, the aerosol-generating article may be provided at a location along a hollow tube provided downstream of the aerosol-generating substrate.

In preferred embodiments of the invention, the aerosol-generating article comprises the aerosol-generating substrate, at least one hollow tube downstream of the aerosol-generating substrate and a filter downstream of the at least one hollow tube. Optionally, the aerosol-generating article further comprises a mouth end cavity at the downstream end of the filter. Preferably, a ventilation zone is provided at a location along the at least one hollow tube.

In a particularly preferred embodiment having this arrangement, the aerosol-generating substrate has a length of about 33 mm and an external diameter of between about 5.5 mm and 6.7 mm, wherein the aerosol-generating substrate comprises about 340 mg of the homogenised dill seed material in the form of a plurality of strands, wherein the homogenised dill seed material comprises about 14 percent by weight glycerol on a dry weight basis. In this embodiment, the aerosol-generating article has a total length of about 74 mm and comprises a cellulose acetate tow filter having a length of about 10 mm, as well as a mouth end cavity defined by a hollow tube having a length of about 6-7 mm. The aerosol-generating article comprises a hollow tube downstream of the aerosol-generating substrate, wherein the hollow tube has a length of about 25 mm and is provided with a ventilation zone.

The aerosol-generating articles according to the invention may have a total length of at least about 30 mm, or at least about 40 mm. The total length of the aerosol-generating article may be less than 90 mm, or less than about 80 mm.

In one embodiment, the aerosol-generating article has a total length of between about 40 mm and about 50 mm, preferably about 45 mm. In another embodiment, the aerosol-generating article has a total length of between about 70 mm and about 90 mm, preferably between about 80 mm and about 85 mm. in another embodiment, the aerosol-generating article has a total length of between about 72 mm and about 76 mm, preferably about 74 mm.

The aerosol-generating article may have an external diameter of about 5 mm to about 8 mm, preferably between about 6 mm and about 8 mm. In one embodiment, the aerosol-generating article has an external diameter of about 7.3 mm.

Aerosol-generating articles according to the invention may further comprise one or more aerosol-modifying elements. An aerosol-modifying element may provide an aerosol-modifying agent. As used herein, the term aerosol-modifying agent is used to describe any agent that, in use, modifies one or more features or properties of aerosol passing through the filter. Suitable aerosol-modifying agents include, but are not limited to, agents that, in use, impart a taste or aroma to aerosol passing through the filter or agents that, in use, remove flavors from the aerosol passing through the filter.

An aerosol-modifying agent may be one or more of moisture or a liquid flavourant. Water or moisture may modify the sensorial experience of the user, for example by moistening the generated aerosol, which may provide a cooling effect on the aerosol and may reduce the perception of harshness experienced by the user. An aerosol-modifying element may be in the form of a flavour-delivery element to deliver one or more liquid flavourants. Alternatively, a liquid flavorant may be added directly to the homogenised plant material, for example, by adding the flavour to the slurry or feedstock during production of the homogenised plant material, or by spraying the liquid flavourant onto the surface of the homogenised plant material.

The one or more liquid flavourants may comprise any flavour compound or botanical extract suitable for being releasably disposed in liquid form within the flavour-delivery element to enhance the taste of aerosol produced during use of the aerosol-generating article. The flavourants, liquid or solid, can also be disposed directly in the material which forms the filter, such as cellulose acetate tow. Suitable flavours or flavourings include, but are not limited to, menthol, mint, such as peppermint and spearmint, chocolate, liquorice, citrus and other fruit flavours, gamma octalactone, vanillin, ethyl vanillin, breath freshener flavours, spice flavours such as cinnamon, methyl salicylate, linalool, eugenol, bergamot oil, geranium oil, lemon oil, *cannabis* oil, and tobacco flavour. Other suitable flavours may include flavour compounds selected from the group consisting of an acid, an alcohol, an ester, an aldehyde, a ketone, a pyrazine, combinations or blends thereof and the like.

An aerosol-modifying agent may be an adsorbent material such as activated carbon, which removes certain constituents of the aerosol passing through the filter and thereby modifies the flavour and aroma of the aerosol.

The one or more aerosol-modifying elements may be located downstream of the aerosol-generating substrate or within the aerosol-generating substrate. The aerosol-generating substrate may comprise homogenised dill seed material and an aerosol-modifying element. In various embodiments, the aerosol-modifying element may be placed adjacent to the homogenised dill seed material or embedded in the homogenised dill seed material. Typically, aerosol-modifying elements may be located downstream of the aerosol-generating substrate, most typically, within the aerosol-cooling element, within the filter of the aerosol-generating article, such as within a filter plug or within a cavity between filter plugs. The one or more aerosol-modifying elements may be in the form of one or more of a thread, a capsule, a microcapsule, a bead or a polymer matrix material, or a combination thereof.

If an aerosol-modifying element is in the form of a thread, as described in WO-A-2011/060961, the thread may be formed from paper such as filter plug wrap, and the thread may be loaded with at least one aerosol-modifying agent and located within the body of the filter. Other materials that can be used to form a thread include cellulose acetate and cotton.

If an aerosol-modifying element is in the form of a capsule, as described in WO-A-2007/010407, WO-A-2013/068100 and WO-A-2014/154887, the capsule may be a breakable capsule located within the filter, the inner core of the capsule containing an aerosol-modifying agent which may be released upon breakage of the outer shell of the capsule when the filter is subjected to external force. The capsule may be located within a filter plug or within a cavity between filter plugs.

If an aerosol-modifying element is in the form of a polymer matrix material, the polymer matrix material releases the flavourant when the aerosol-generating article is heated, such as when the polymer matrix is heated above the melting point of the polymer matrix material as described in WO-A-2013/034488. Typically, such polymer matrix material may be located within a bead within the aerosol-generating substrate. Alternatively, or in addition, the flavourant may be trapped within the domains of a polymer matrix material and releasable from the polymer matrix material upon compression of the polymer matrix material. Preferably, the flavorant is released upon compression of the polymer matrix material with a force of around 15 Newtons. Such flavour-modifying elements may provide a sustained release of the liquid flavourant over a range of force of at least 5 Newtons, such as between 5N and 20N, as described in WO2013/068304. Typically, such polymer matrix material may be located within a bead within the filter.

The aerosol-generating article may comprise a combustible heat source and an aerosol-generating substrate downstream of the combustible heat source, the aerosol-generating substrate as described above with respect to the first aspect of the invention.

For example, substrates as described herein may be used in heated aerosol-generating articles of the type disclosed in WO-A-2009/022232, which comprise a combustible carbon-based heat source, an aerosol-generating substrate downstream of the combustible heat source, and a heat-conducting element around and in contact with a rear portion of the combustible carbon-based heat source and an adjacent front portion of the aerosol-generating substrate. However, it will be appreciated that substrates as described herein may also be used in heated aerosol-generating articles comprising combustible heat sources having other constructions.

The present invention provides an aerosol-generating system comprising an aerosol-generating device comprising a heating element, and an aerosol-generating article for use with the aerosol-generating device, the aerosol-generating article comprising the aerosol-generating substrate as described above.

In a preferred embodiment, aerosol-generating substrates as described herein may be used in heated aerosol-generating articles for use in electrically-operated aerosol-generating systems in which the aerosol-generating substrate of the heated aerosol-generating article is heated by an electrical heat source.

For example, aerosol-generating substrates as described herein may be used in heated aerosol-generating articles of the type disclosed in EP-A-0 822 760.

The heating element of such aerosol-generating devices may be of any suitable form to conduct heat. The heating of the aerosol-generating substrate may be achieved internally, externally or both. The heating element may preferably be a heater blade or pin adapted to be inserted into the substrate so that the substrate is heated from inside. Alternatively, the heating element may partially or completely surround the substrate and heat the substrate circumferentially from the outside.

The aerosol-generating system may be an electrically-operated aerosol generating system comprising an inductive heating device. Inductive heating devices typically comprise an induction source that is configured to be coupled to a susceptor, which may be provided externally to the aerosol-generating substrate or internally within the aerosol-generating substrate. The induction source generates an alternating electromagnetic field that induces magnetization or eddy currents in the susceptor. The susceptor may be heated as a result of hysteresis losses or induced eddy currents which heat the susceptor through ohmic or resistive heating.

Electrically operated aerosol-generating systems comprising an inductive heating device may also comprise the aerosol-generating article having the aerosol-generating substrate and a susceptor in thermal proximity to the aerosol-generating substrate. Typically, the susceptor is in direct contact with the aerosol-generating substrate and heat is transferred from the susceptor to the aerosol-generating substrate primarily by conduction. Examples of electrically operated aerosol-generating systems having inductive heating devices and aerosol-generating articles having susceptors are described in WO-A1-95/27411 and WO-A1-2015/177255.

A susceptor may be a plurality of susceptor particles which may be deposited on or embedded within the aerosol-generating substrate. When the aerosol-generating substrate is in the form of one or more sheets, a plurality of susceptor particles may be deposited on or embedded within the one or more sheets. The susceptor particles are immobilized by the substrate, for example, in sheet form, and remain at an initial position. Preferably, the susceptor particles may be homogeneously distributed in the homogenised dill seed material of the aerosol-generating substrate. Due to the particulate nature of the susceptor, heat is produced according to the distribution of the particles in the homogenised dill seed material sheet of the substrate. Alternatively, the susceptor in the form of one or more sheets, strips, shreds or rods may also be placed next to the homogenised dill seed material or used as embedded in the homogenised dill seed material. In one embodiment, the aerosol forming substrate comprises one or more susceptor strips. In another embodiment, the susceptor is present in the aerosol-generating device.

The susceptor may have a heat loss of more than 0.05 Joule per kilogram, preferably a heat loss of more than 0.1 Joule per kilogram. Heat loss is the capacity of the susceptor to transfer heat to the surrounding material. Because the susceptor particles are preferably homogeneously distributed in the aerosol-generating substrate, a uniform heat loss from the susceptor particles may be achieved thus generating a uniform heat distribution in the aerosol-generating substrate and leading to a uniform temperature distribution in the aerosol-generating article. It has been found that a specific minimal heat loss of 0.05 Joule per kilogram in the susceptor particles allows for heating of the aerosol-generating substrate to a substantially uniform temperature, thus providing aerosol generation. Preferably, the average temperatures achieved within the aerosol-generating substrate in such embodiments are about 200 degree Celsius to about 240 degrees Celsius.

Reducing the risk of overheating the aerosol-generating substrate may be supported by the use of susceptor materials having a Curie temperature, which allows a heating process due to hysteresis loss only up to a certain maximum temperature. The susceptor may have a Curie temperature between about 200 degree Celsius and about 450 degree Celsius, preferably between about 240 degree Celsius and about 400 degree Celsius, for example about 280 degree Celsius. When a susceptor material reaches its Curie temperature, the magnetic properties change. At the Curie temperature the susceptor material changes from a ferromagnetic phase to a paramagnetic phase. At this point, heating based on energy loss due to orientation of ferromagnetic domains stops. Further heating is then mainly based on eddy current formation such that a heating process is automatically reduced upon reaching the Curie temperature of the susceptor material. Preferably, susceptor material and its Curie temperature are adapted to the composition of the aerosol-generating substrate in order to achieve an optimal temperature and temperature distribution in the aerosol-generating substrate for an optimum aerosol generation.

In some preferred embodiments of the aerosol-generating article according to the invention, the susceptor is made of ferrite. Ferrite is a ferromagnet with a high magnetic permeability and especially suitable as susceptor material. The main component of ferrite is iron. Other metallic components, for example, zinc, nickel, manganese, or non-metallic components, for example silicon, may be present in varying amounts. Ferrite is a relatively inexpensive, commercially available material. Ferrite is available in particle form in the size ranges of the particles used in the particulate plant material forming the homogenised plant material according to the invention. Preferably, the particles are a fully sintered ferrite powder, such as for example FP160, FP215, FP350 by PPT, Indiana USA.

In certain embodiments of the invention, the aerosol-generating system comprises an aerosol-generating article comprising an aerosol-generating substrate as defined above, a source of aerosol former and a means to vaporise the aerosol former, preferably a heating element as described above. The source of aerosol former can be a reservoir, which can be refillable or replaceable, that resides on the aerosol generating device. While the reservoir is physically separate from the aerosol generating article, the vapour that is generated is directed through the aerosol-generating article. The vapour makes contact with the aerosol-generating substrate which releases volatile compounds, such as nicotine and flavourants in the particulate plant material, to form an aerosol. Optionally, to aid volatilization of compounds in the aerosol-generating substrate, the aerosol-generating system may further comprise a heating element to heat the aerosol-generating substrate, preferably in a co-ordinated manner with the aerosol former. However, in certain embodiments, the heating element used to heat the aerosol generating article is separate from the heater that heats the aerosol former.

As defined above, the present invention further provides an aerosol produced upon heating of an aerosol-generating substrate, wherein the aerosol comprises specific amounts and ratios of the characteristic compounds derived from dill seed particles as defined above.

According to the invention, the aerosol comprises carvone in an amount of at least 0.5 micrograms per puff of aerosol; and limonene in an amount of at least 0.05 micrograms per puff of aerosol, wherein a puff of aerosol has a volume of 55 millilitres as generated by a smoking machine. For the purposes of the present invention, a "puff" is defined as a volume of aerosol released from an aerosol-generating substrate upon heating and collected for analysis, wherein the puff of aerosol has a puff volume of 55 millilitres as generated by a smoking machine. Accordingly, any reference herein to a "puff" of aerosol should be understood to refer to a 55 millilitre puff unless stated otherwise.

The ranges indicated define the total amount of each component measured in a 55 millilitre puff of aerosol. The aerosol may be generated from an aerosol-generating substrate using any suitable means and may be trapped and analysed as described above in order to identify the characteristic compounds within the aerosol and measure the amounts thereof. For example, the "puff" may correspond to a 55 millilitre puff taken on a smoking machine such as that used in the Health Canada test method described herein.

Preferably, the aerosol according to the present invention comprises at least about 2 micrograms of carvone per puff of aerosol, more preferably at least about 5 micrograms of carvone per puff of aerosol. Alternatively, or in addition, the aerosol generated from the aerosol-generating substrate comprises up to about 50 micrograms of carvone per puff of aerosol, preferably up to about 40 micrograms of carvone per puff of aerosol and more preferably up to about 25 micrograms of carvone per puff of aerosol. For example, the aerosol generated from the aerosol-generating substrate may comprise between about 0.1 micrograms and about 50 micrograms of carvone per puff of aerosol, or between about 2 micrograms carvone per puff of aerosol and about 40 micrograms of carvone per puff of aerosol, or between about 5 micrograms and about 25 micrograms of carvone per puff of aerosol.

Preferably, the aerosol according to the present invention comprises at least about 0.2 micrograms of limonene per puff of aerosol, more preferably at least about 0.5 micrograms of limonene per puff of aerosol. Alternatively, or in addition, the aerosol generated from the aerosol-generating substrate preferably comprises up to about 10 micrograms of limonene per puff of aerosol, more preferably up to about 8 micrograms of limonene per puff of aerosol, even more preferably up to about 6 micrograms of limonene per puff of aerosol. For example, the aerosol generated from the aerosol-generating substrate may comprise between about 0.05 micrograms and about 10 micrograms of limonene per puff of aerosol, or between about 0.2 micrograms and about 8 micrograms of limonene per puff of aerosol, or between about 0.5 micrograms and about 6 micrograms of limonene per puff of aerosol.

According to the present invention, the aerosol composition is such that the amount of carvone per puff of aerosol is preferably no more than about 10 times the amount of limonene per puff of aerosol. The ratio of carvone to limonene in the aerosol is therefore preferably no more than about 10:1. Preferably, the aerosol composition is such that the amount of carvone per puff of aerosol is no more than about 8 times the amount of limonene per puff of aerosol.

The defined ratio of carvone to limonene characterises an aerosol that is derived from dill seed particles. In contrast, in an aerosol produced from dill essential oil, the ratio of carvone to limonene would be significantly different.

Preferably, the aerosol according to the invention further comprises at least about 0.1 milligrams of aerosol former per puff of aerosol, more preferably at least about 0.2 milligrams of aerosol per puff of aerosol and more preferably at least about 0.3 milligrams of aerosol former per puff of aerosol. Preferably, the aerosol comprises up to 0.6 milligrams of aerosol former per puff of aerosol, more preferably up to 0.5 milligrams aerosol former per puff of aerosol, more preferably up to 0.4 milligrams aerosol former per puff of aerosol. For example, the aerosol may comprise between about 0.1 milligrams and about 0.6 milligrams of aerosol former per puff of aerosol, or between about 0.2 milligrams and about 0.5 milligrams of aerosol former per puff of aerosol, or between about 0.3 milligrams and about 0.4 milligrams of aerosol former per puff of aerosol. These values are based on a puff volume of 55 millilitres, as defined above.

Suitable aerosol formers for use in the present invention are set out above.

Preferably, the aerosol produced from an aerosol-generating substrate according to the present invention further comprise at least about 2 micrograms of nicotine per puff of aerosol, more preferably at least about 20 microgram of nicotine per puff of aerosol, more preferably at least about 40 micrograms of nicotine per puff of aerosol. Preferably, the aerosol comprises up to about 200 micrograms of nicotine per puff of aerosol, more preferably up to about 150 micrograms of nicotine per puff of aerosol, more preferably up to about 75 micrograms of nicotine per puff of aerosol. For example, the aerosol may comprise between about 2 micrograms and about 200 micrograms of nicotine per puff of aerosol, or between about 20 microgram and about 150 micrograms of nicotine per puff of aerosol, or between about 40 micrograms and about 75 micrograms of nicotine per puff of aerosol. These values are based on a puff volume of 55 millilitres, as defined above. In some embodiments of the present invention, the aerosol may contain zero micrograms of nicotine.

Alternatively or in addition, the aerosol according to the present invention may optionally further comprise at least about 0.5 milligrams of a cannabinoid compound per puff of aerosol, more preferably at least about 1 milligram of a cannabinoid compound per puff of aerosol, more preferably at least about 2 milligrams of a cannabinoid compound per puff of aerosol. Preferably, the aerosol comprises up to about 5 milligrams of a cannabinoid compound per puff of aerosol, more preferably up to about 4 milligrams of a cannabinoid compound per puff of aerosol, more preferably up to about 3 milligrams of a cannabinoid compound per puff of aerosol. For example, the aerosol may comprise between about 0.5 milligrams and about 5 milligrams of a cannabinoid compound per puff of aerosol, or between about 1 milligram and about 4 milligrams of a cannabinoid compound per puff of aerosol, or between about 2 milligrams and about 3 milligrams of a cannabinoid compound per puff of aerosol. In some embodiments of the present invention, the aerosol may contain zero micrograms of cannabinoid compound. These values are based on a puff volume of 55 millilitres, as defined above.

Preferably, the cannabinoid compound is selected from CBD and THC. More preferably, the cannabinoid compound is CBD.

Carbon monoxide may also be present in the aerosol according to the invention and may be measured and used to further characterise the aerosol. Oxides of nitrogen such as nitric oxide and nitrogen dioxide may also be present in the aerosol and may be measured and used to further characterise the aerosol.

The aerosol according to the invention comprising the characteristic compounds from the dill seed particles may be formed of particles having a mass median aerodynamic diameter (MMAD) in the range of about 0.01 to 200 microns, or about 1 to 100 microns. Preferably, where the aerosol comprises nicotine as described above, the aerosol comprises particles having a MMAD in the range of about 0.1 to about 3 microns in order to optimise the delivery of nicotine from the aerosol.

The mass median aerodynamic diameter (MMAD) of an aerosol refers to the aerodynamic diameter for which half the particulate mass of the aerosol is contributed by particles with an aerodynamic diameter larger than the MMAD and half by particles with an aerodynamic diameter smaller than the MMAD. The aerodynamic diameter is defined as the diameter of a spherical particle with a density of 1 $g/cm^3$ that has the same settling velocity as the particle being characterised.

The mass median aerodynamic diameter of an aerosol according to the invention may be determined in accordance with Section 2.8 of Schaller et al., "Evaluation of the Tobacco Heating System 2.2. Part 2: Chemical composition, genotoxicity, cytotoxicity and physical properties of the aerosol," Regul. Toxicol. and Pharmacol., 81 (2016) S27-S47.

As defined above, the invention further provides an aerosol-generating article comprising an aerosol-generating substrate, the aerosol-generating substrate comprising a homogenised plant material, wherein upon heating of the aerosol-generating substrate according to Test Method A, the aerosol generated from the aerosol-generating substrate comprises: carvone in an amount of at least 0.5 micrograms per puff of aerosol; and limonene in an amount of at least 0.05 microgram per puff of aerosol, wherein the amount of carvone per puff of aerosol is no more than about 10 times the amount of limonene per puff of aerosol and wherein a puff of aerosol has a volume of 55 millilitres as generated by a smoking machine.

For the purposes of the present invention, a "puff" is defined as a volume of aerosol released from an aerosol-generating substrate upon heating and collected for analysis, wherein the puff of aerosol has a puff volume of 55 millilitres as generated by a smoking machine. Accordingly, any reference herein to a "puff" of aerosol should be understood to refer to a 55 millilitre puff unless stated otherwise. The ranges indicated define the total amount of each component measured in a 55 millilitre puff of aerosol. The aerosol may be generated from an aerosol-generating substrate using any suitable means and may be trapped and analysed as described above in order to identify the characteristic compounds within the aerosol and measure the amounts thereof. For example, the "puff" may correspond to a 55 millilitre puff taken on a smoking machine such as that used in the Health Canada test method described herein.

As defined above, the present invention also provides an aerosol-generating substrate formed of a homogenised plant material comprising at least about 2.5 percent by weight dill seed particles on a dry weight basis, an aerosol former and a binder, wherein the aerosol-generating substrate comprises: at least 100 micrograms of carvone per gram of the substrate, on a dry weight basis; and at least 2 micrograms of limonene per gram of the substrate, on a dry weight basis, wherein the amount of carvone per gram of the substrate is no more than about 50 times the amount of limonene per gram of the substrate.

Below, there is provided a non-exhaustive list of non-limiting examples. Any one or more of the features of these examples may be combined with any one or more features of another example, embodiment, or aspect described herein.

EX1. An aerosol-generating article comprising an aerosol-generating substrate, the aerosol-generating substrate including a homogenised dill seed material, the homogenised dill seed material comprising dill seed particles, an aerosol former and a binder, wherein the aerosol-generating substrate comprises:
at least 100 micrograms of carvone per gram of the substrate, on a dry weight basis; and
at least 2 micrograms of limonene per gram of the substrate, on a dry weight basis.

EX2. An aerosol-generating article according to example EX1 wherein the amount of carvone per gram of the substrate is no more than 50 times the amount of limonene per gram of the substrate.

EX3. An aerosol-generating article according to example EX1 or EX2, wherein the aerosol-generating substrate comprises between 100 micrograms and 4500 micrograms of carvone per gram of the substrate on a dry weight basis.

EX4. An aerosol-generating article according to any one of examples EX1 to EX3, wherein the aerosol-generating substrate comprises between 2 micrograms and 200 micrograms of limonene per gram of the substrate on a dry weight basis.

EX5. An aerosol-generating article according to any one of examples EX1 to EX4, wherein upon heating of the aerosol-generating substrate according to Test Method A, an aerosol is generated comprising:
at least 20 micrograms of carvone per gram of the substrate, on a dry weight basis; and
at least 2 micrograms of limonene per gram of the substrate, on a dry weight basis,
wherein the amount of carvone in the aerosol per gram of the substrate is no more than 10 times the amount of limonene in the aerosol per gram of the substrate.

EX6. An aerosol-generating article according to example EX5, wherein upon heating of the aerosol-generating substrate according to Test Method A, an aerosol is generated comprising up to 1500 micrograms of carvone per gram of the substrate, on a dry weight basis.

EX7. An aerosol-generating article according to example EX5 or EX6, wherein upon heating of the aerosol-generating substrate according to Test Method A, an aerosol is generated comprising up to 300 micrograms of limonene per gram of the substrate, on a dry weight basis.

EX8. An aerosol-generating article according to any one of examples EX5 to EX7, wherein upon heating of the aerosol-generating substrate according to Test Method A, an aerosol is generated comprising zero micrograms of nicotine per gram of the substrate.

EX9. An aerosol-generating article according to any one of examples EX1 to EX4, wherein upon heating of the aerosol-generating substrate in a THS2.2 holder under the Health Canada machine-smoking regimen, an aerosol is generated comprising:
at least 20 micrograms of carvone per gram of the substrate, on a dry weight basis; and
at least 2 micrograms of limonene per gram of the substrate, on a dry weight basis,
wherein the amount of carvone in the aerosol per gram of the substrate is no more than 10 times the amount of limonene in the aerosol per gram of the substrate.

EX10. An aerosol-generating article according to any one of examples EX1 to EX9, wherein the homogenised dill seed material comprises at least 2.5 percent by weight of the dill seed particles, on a dry weight basis.

EX11. An aerosol-generating article according to any one of examples EX1 to EX10, wherein the homogenised dill seed material comprises up to 25 percent by weight of the dill seed particles, on a dry weight basis.

EX12. An aerosol-generating article according to any one of examples EX1 to EX11, wherein the homogenised dill seed material comprises up to 65 percent by weight of the dill seed particles, on a dry weight basis.

EX13. An aerosol-generating article according to any one of examples EX1 to EX 12, wherein the homogenised dill seed material further comprises up to about 75 percent by weight of tobacco particles, on a dry weight basis.

EX14. An aerosol-generating article according to any one of examples EX1 to EX13, wherein the homogenised dill seed material further comprises tobacco particles and wherein the weight ratio of dill seed particles to tobacco particles is no more than 1:4.

EX15. An aerosol-generating article according to example EX13 or EX14, wherein the homogenised dill seed material comprises between 5 percent and 20 percent by weight of dill seed particles and between 55 percent and 70 percent by weight of tobacco particles, on a dry weight basis.

EX16. An aerosol generating article according to any one of examples EX1 to EX15, wherein the homogenised dill seed material comprises substantially zero nicotine.

EX17. An aerosol-generating article according to any one of examples EX1 to EX15, wherein the aerosol-generating substrate further comprises at least 0.1 mg of nicotine per gram of the substrate, on a dry weight basis.

EX18. An aerosol-generating article according to example EX17, wherein the aerosol-generating substrate comprises between 1 milligram and 20 milligrams of nicotine per gram of the substrate, on a dry weight basis.

EX19. An aerosol-generating article according to any one of examples EX1 to EX18, wherein the dill seed particles have a D95 value of from greater than or equal to about 200 microns to a D95 value of less than or equal to about 900 microns.

EX20. An aerosol-generating article according to any one of examples EX1 to EX19, wherein the dill seed particles have a D5 value of from greater than or equal to about 10 microns to a D5 value of less than or equal to about 50 microns.

EX21. An aerosol-generating article according to any one of examples EX1 to EX20, wherein the dill seed particles are purposely ground.

EX22. An aerosol-generating article according to any one of examples EX1 to EX21, wherein the diameter of 100 percent of the dill seed particles is less than or equal to 300 microns.

EX23. An aerosol-generating article according to any one of examples EX1 to EX22, wherein the homogenised dill seed material comprises up to 75 percent by weight of particulate plant material, the particulate plant material comprising the dill seed particles.

EX24. An aerosol-generating article according to any one of examples EX1 to EX23, wherein the homogenised dill seed material has an aerosol former content of between 5 percent and about 30 percent by weight on a dry weight basis.

EX25. An aerosol-generating article according to any one of examples EX1 to EX24, wherein the binder is selected from: gums such as, for example, guar gum, xanthan gum, arabic gum and locust bean gum; cellulosic binders such as, for example, hydroxypropyl cellulose, carboxymethyl cellulose, hydroxyethyl cellulose, methyl cellulose and ethyl cellulose; polysaccharides such as, for example, starches, organic acids, such as alginic acid, conjugate base salts of organic acids, such as sodium-alginate, agar and pectins; and combinations thereof.

EX26. An aerosol-generating article according to any one of examples EX1 to EX25, wherein the homogenised dill seed material comprises between 1 percent by weight and 10 percent by weight of binder, on a dry weight basis.

EX27. An aerosol-generating article according to any one of examples EX1 to EX26, wherein the binder comprises guar gum.

EX28. An aerosol-generating article according to any one of examples EX1 to EX26, wherein the binder comprises cellulose ether and wherein the homogenised dill seed material comprises between about 2 percent and about 10 percent by weight of the cellulose ether.

EX29. An aerosol-generating article according to example EX28, wherein the homogenised dill material further comprises additional cellulose that is not derived from the dill seed particles, wherein the additional cellulose comprises at least one of cellulose powder and cellulose fibres.

EX30. An aerosol-generating article according to example EX29, wherein the ratio of additional cellulose material to cellulose ether in the homogenised dill seed material is at least 2.

EX31. An aerosol-generating article according to EX29 or EX30, wherein the homogenised dill material comprises: between 2.5 percent by weight and 75 percent by weight of dill seed particles, on a dry weight basis; between 15 percent by weight and 55 percent by weight of aerosol former, on a dry weight basis; between 2 percent by weight and 10 percent by weight of cellulose ether, on a dry weight basis; and between 3 percent by weight and 50 percent by weight of additional cellulose, on a dry weight basis.

EX32. An aerosol-generating article according to any one of examples EX1 to EX31, wherein the homogenised dill seed material further comprises fibers.

EX33. An aerosol-generating article according to example EX32, wherein the fibres have lengths of greater than 400 micrometers.

EX34. An aerosol-generating article according to example EX32 or EX33, wherein the fibers are present in an amount of between about 2 percent by weight and about 15 percent by weight, based on the dry weight of the aerosol-generating substrate.

EX35. An aerosol generating article according to example EX32 or EX33, wherein the fibers are present in an amount of at least 30 percent by weight, based on the dry weight of the aerosol-generating substrate.

EX36. An aerosol-generating article according to any one of examples EX1 to EX35, wherein the homogenised dill seed material comprises dill seed particles, between about 5 percent by weight and about 30 percent by weight of aerosol former and between about 1 percent by weight and about 10 percent by weight of binder, on a dry weight basis.

EX37. An aerosol-generating article according to example EX36, wherein the homogenised dill seed material further comprises between about 2 percent by weight and about 15 percent by weight of fibers.

EX38. An aerosol-generating article according to example EX36 or EX37, wherein the binder is guar gum.

EX39. An aerosol-generating article according to any one of examples EX1 to EX38, wherein the homogenised dill seed material is in the form of one or more sheets.

EX40. An aerosol-generating article according to example EX39, wherein each of the one or more sheets have a thickness of between 100 micrometres and 600 micrometres.

EX41. An aerosol-generating article according to example EX39, wherein each of the one or more sheets have a grammage of between 100 g/m$^2$ and 300 g/m$^2$.

EX42. An aerosol-generating article according to any one of examples EX39 to EX41, wherein each of the one or more sheets have a density of from 0.3 g/cm$^3$ to 1.3 g/cm$^3$.

EX43. An aerosol-generating article according to any one of examples EX39 to EX42, wherein each of the one or more sheets have a tensile strength at peak in a cross direction of from 50 N/m to 400 N/m.

EX44. An aerosol-generating article according to any one of examples EX39 to EX43, wherein each of the one or more sheets have a tensile strength at peak in a machine direction of from 100 N/m to 800 N/m.

EX45. An aerosol-generating article according to any one of examples EX39 to EX44, wherein the one or more sheets are in the form of one or more gathered sheets.

EX46. An aerosol-generating article according to any one of examples EX1 to EX38, wherein the homogenised dill seed material is in the form of a plurality of strands.

EX47. An aerosol-generating article according to example EX46, wherein the width of the strands is at least 0.2 mm.

EX48. An aerosol-generating article according to example EX46 or EX47, wherein the plurality of strands extend substantially longitudinally along the length of the aerosol-generating substrate, aligned with the longitudinal axis.

EX49. An aerosol-generating article according to example EX46, EX47 or EX48, wherein the plurality of strands each have a mass to surface area ratio of at least 0.02 milligrams per square millimetre.

EX50. An aerosol-generating article according any one of examples EX1 to EX49, wherein the homogenised dill seed material in the aerosol-generating substrate is in the form of cast leaf.

EX51. An aerosol-generating article according any one of examples EX1 to EX49, wherein the homogenised dill seed material in the aerosol-generating substrate is in the form of dill seed paper.

EX52. An aerosol-generating article according to any one of examples EX1 to EX51, wherein upon heating of the aerosol-generating substrate according to Test Method A, the aerosol generated from the aerosol-generating substrate comprises:
  carvone in an amount of at least 0.5 micrograms per puff of aerosol; and
  limonene in an amount of at least 0.05 micrograms per puff of aerosol, wherein a puff of aerosol has a volume of 55 millilitres as generated by a smoking machine, wherein the amount of carvone per puff of aerosol is no more than 10 times the amount of limonene per puff of aerosol.

EX53. An aerosol-generating article comprising an aerosol-generating substrate, the aerosol-generating substrate including a homogenised dill seed material comprising dill seed particles, between about 5 percent by weight and about 30 percent by weight of aerosol former and between about 1 percent by weight and about 10 percent by weight of binder, on a dry weight basis.

EX54. An aerosol-generating article according to example EX53, wherein the homogenised dill seed material further comprises an essential oil, preferably an dill seed essential oil.

EX55. An aerosol-generating article according to examples EX53 or EX54, wherein the homogenised dill seed material further comprises tobacco particles.

EX56. An aerosol-generating article according to any one of examples EX53 to EX55, wherein the homogenised dill seed material comprises at least 2.5% by weight of dill seed particles, on a dry weight basis.

EX57. An aerosol-generating substrate comprising a homogenised dill seed material comprising dill seed particles, aerosol former and binder, wherein the aerosol-generating substrate comprises:
  at least 100 micrograms of carvone per gram of the substrate, on a dry weight basis;
  at least 2 micrograms of limonene per gram of the substrate, on a dry weight basis, wherein the amount of carvone per gram of the substrate is no more than 50 times the amount of limonene per gram of the substrate.

EX58. An aerosol-generating system comprising:
  an aerosol-generating device comprising a heating element; and
  an aerosol-generating article according to any of examples EX1 to EX56.

EX59. An aerosol-generating system according to example EX58, wherein the heating element is a heater blade adapted to be inserted into the aerosol-generating substrate.

EX60. An aerosol produced upon heating of an aerosol-generating substrate according to example EX57, the aerosol comprising:
  carvone in an amount of at least 0.5 micrograms per puff of aerosol; and
  limonene in an amount of at least 0.05 micrograms per puff of aerosol,
  wherein a puff of aerosol has a volume of 55 millilitres as generated by a smoking machine, wherein the amount of carvone per gram of the substrate is no more than 10 times the amount of carvone per gram of the substrate.

EX61. A method of making an aerosol-generating substrate comprising the steps of:
  forming a slurry comprising dill seed particles, water, an aerosol former, a binder and optionally tobacco particles;
  casting or extruding the slurry in the form of a sheet or strands; and
  drying the sheet or strands at between 80 and 160 degrees Celsius.

EX62. A method according to example EX60, wherein the slurry is cast onto a supportive surface and dried to form a sheet of cast leaf.

EX63. A method of making an aerosol-generating substrate comprising the steps of: forming a dilute suspension comprising dill seed particles, water and optionally tobacco particles;
  separating the suspension into an insoluble portion and a liquid extract;
  forming the insoluble portion into a sheet;
  concentrating the liquid extract and adding the concentrated liquid extract to the sheet to form an dill seed paper.

Specific embodiments will be further described, by way of example only, with reference to the accompanying drawings in which.

Figure 5:
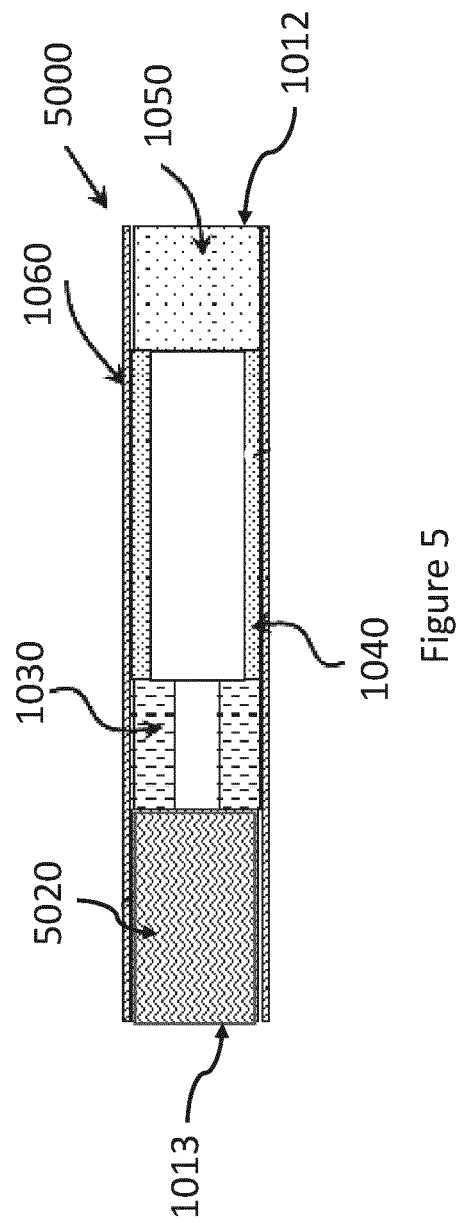

FIGS. 4*a* and 4*b* illustrate a second embodiment of a substrate of an aerosol-generating article as described herein;

FIG. 5 illustrates a third embodiment of a substrate of an aerosol-generating article as described herein;

FIGS. 6*a*, 6*b* and 6*c* each show a cross sectional view of filter 1050 further comprising an aerosol-modifying element, wherein FIG. 6*a* illustrates the aerosol-modifying element in the form of a spherical capsule or bead within a filter plug.

FIG. 6*b* illustrates the aerosol-modifying element in the form of a thread within a filter plug.

Figure 7:
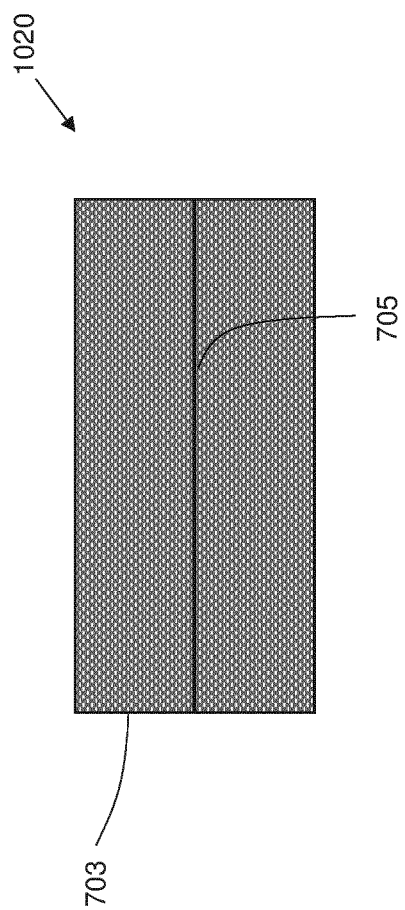
Figure 8:
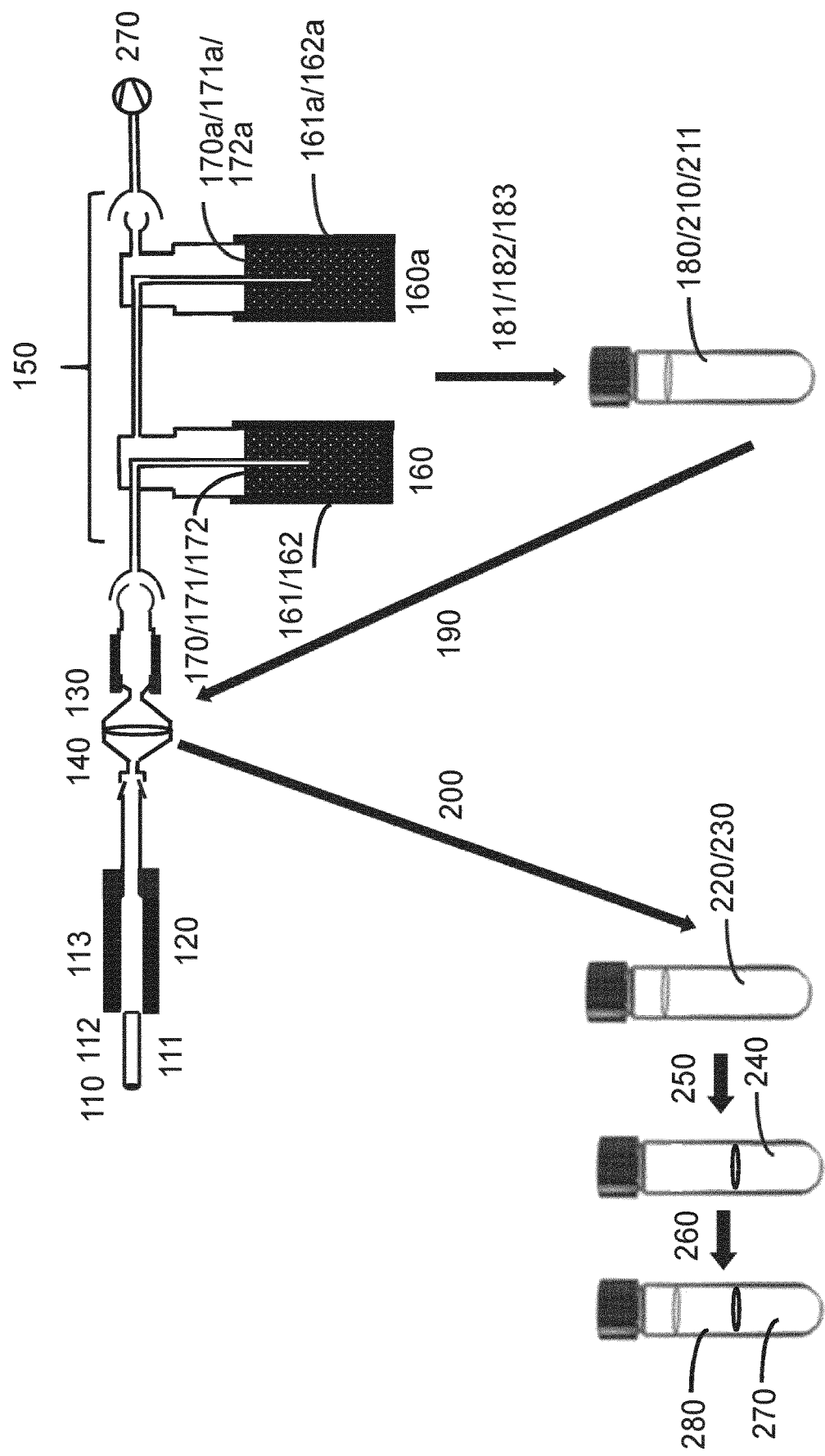

FIG. 6*c* illustrates the aerosol-modifying element in the form of a spherical capsule within a cavity within the filter;

FIG. 7 is a cross sectional view of a plug of aerosol-generating substrate 1020 further comprising an elongate susceptor element; and FIG. 8 illustrates an experimental set-up for collecting aerosol samples to be analysed in order to measure characteristic compounds.

Figure 1:
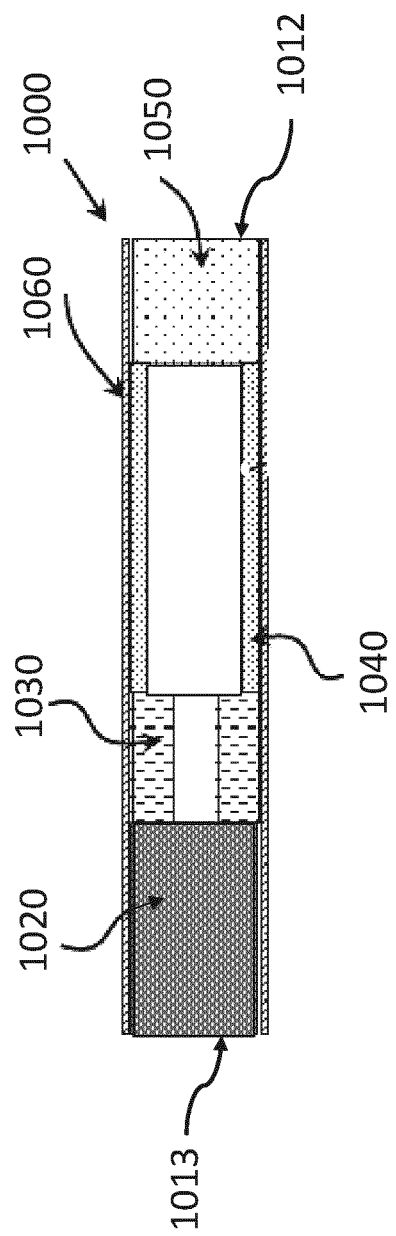
FIG. 1 illustrates a first embodiment of a substrate of an aerosol-generating article as described herein.

FIG. 1 illustrates a heated aerosol-generating article 1000 comprising a substrate as described herein. The article 1000 comprises four elements; the aerosol-generating substrate 1020, a hollow cellulose acetate tube 1030, a spacer element 1040, and a mouthpiece filter 1050. These four elements are arranged sequentially and in coaxial alignment and are assembled by a cigarette paper 1060 to form the aerosol-generating article 1000. The article 1000 has a mouth-end 1012, which a user inserts into his or her mouth during use, and a distal end 1013 located at the opposite end of the article to the mouth end 1012. The embodiment of an aerosol-generating article illustrated in FIG. 1 is particularly suitable for use with an electrically-operated aerosol-generating device comprising a heater for heating the aerosol-generating substrate.

When assembled, the article 1000 is about 45 millimetres in length and has an outer diameter of about 7.2 millimetres and an inner diameter of about 6.9 millimetres.

The aerosol-generating substrate 1020 comprises a plug formed from a sheet of homogenised dill seed material comprising dill seed particles, either alone or in combination with tobacco particles.

A number of examples of a suitable homogenised dill seed material for forming the aerosol-generating substrate 1020 are shown in Table 1 below (see Samples B to D). The sheet is gathered, crimped and wrapped in a filter paper (not shown) to form the plug. The sheet includes additives, including glycerol as an aerosol former.

An aerosol-generating article 1000 as illustrated in FIG. 1 is designed to engage with an aerosol-generating device in order to be consumed. Such an aerosol-generating device includes means for heating the aerosol-generating substrate 1020 to a sufficient temperature to form an aerosol. Typically, the aerosol-generating device may comprise a heating element that surrounds the aerosol-generating article 1000 adjacent to the aerosol-generating substrate 1020, or a heating element that is inserted into the aerosol-generating substrate 1020.

Once engaged with an aerosol-generating device, a user draws on the mouth-end 1012 of the smoking article 1000 and the aerosol-generating substrate 1020 is heated to a temperature of about 375 degrees Celsius. At this temperature, volatile compounds are evolved from the aerosol-generating substrate 1020. These compounds condense to form an aerosol. The aerosol is drawn through the filter 1050 and into the user's mouth.

Figure 2:
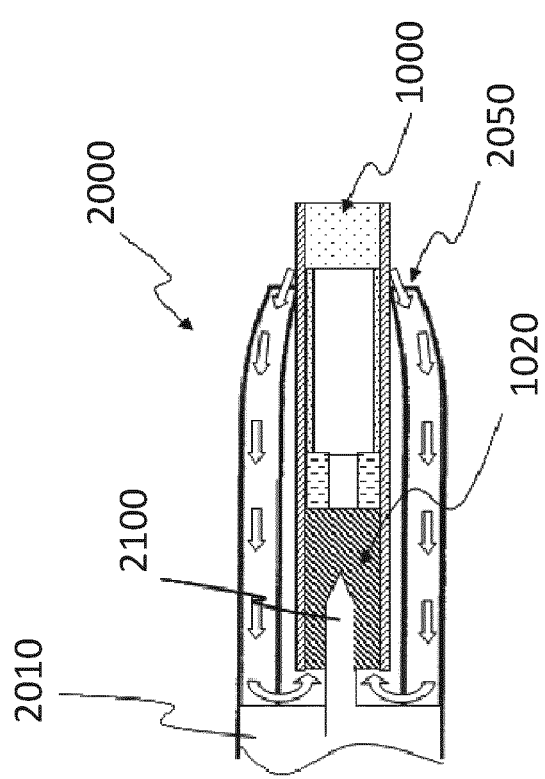
FIG. 2 illustrates an aerosol-generating system comprising an aerosol-generating article and an aerosol-generating device comprising an electric heating element.

FIG. 2 illustrates a portion of an electrically-operated aerosol-generating system 2000 that utilises a heating blade 2100 to heat an aerosol-generating substrate 1020 of an aerosol-generating article 1000. The heating blade is mounted within an aerosol article receiving chamber of an electrically-operated aerosol-generating device 2010. The aerosol-generating device defines a plurality of air holes 2050 for allowing air to flow to the aerosol-generating article 1000. Air flow is indicated by arrows on FIG. 2. The aerosol-generating device comprises a power supply and electronics, which are not illustrated in FIG. 2. The aerosol-generating article 1000 of FIG. 2 is as described in relation to FIG. 1.

Figure 3:
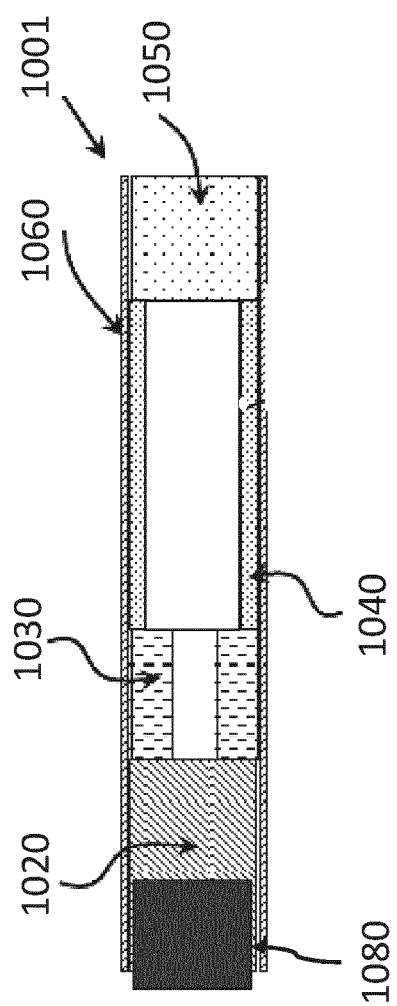
FIG. 3 illustrates an aerosol-generating system comprising an aerosol-generating article and an aerosol-generating device comprising a combustible heating element.

In an alternative configuration shown in FIG. 3, the aerosol-generating system is shown with a combustible heating element. While the article 1000 of FIG. 1 is intended to be consumed in conjunction with an aerosol-generating device, the article 1001 of FIG. 3 comprises a combustible heat source 1080 that may be ignited and transfer heat to the aerosol-generating substrate 1020 to form an inhalable aerosol. The combustible heat source 80 is a charcoal element that is assembled in proximity to the aerosol-generating substrate at a distal end 13 of the rod 11. Elements that are essentially the same as elements in FIG. 1 have been given the same numbering.

FIGS. 4a and 4b illustrate a second embodiment of a heated aerosol-generating article 4000a, 4000b. The aerosol-generating substrate 4020a, 4020b comprises a first downstream plug 4021 formed from of particulate plant material comprising dill seed particles, and a second upstream plug 4022 formed from particulate plant material comprising primarily tobacco particles. A suitable homogenised dill seed material for use in the first downstream plug is shown in Table 1 below as one of Samples A to D. A suitable homogenised tobacco material for use in the second upstream plug is shown in Table 1 below as Sample E. Sample E comprises only tobacco particles and is included for the purposes of comparison only.

In each of the plugs, the homogenised plant material is in the form of sheets, which are crimped and wrapped in a filter paper (not shown). The sheets both include additives, including glycerol as an aerosol former. In the embodiment shown in FIG. 4a, the plugs are combined in an abutting end to end relationship to form the rod and are of equal length of about 6 mm each. In a more preferred embodiment (not shown), the second plug is preferably longer than the first plug, for example, preferably 2 mm longer, more preferably 3 mm longer, such that the second plug is 7 or 7.5 mm in length while the first plug is 5 or 4.5 mm in length, to provide a desired ratio of tobacco to dill seed particles in the substrate. In FIG. 4b, the cellulose acetate tube support element 1030 has been omitted.

The article 4000a, 4000b, analogously to the article 1000 in FIG. 1, is particularly suitable for use with the electrically-operated aerosol-generating system 2000 comprising a heater shown in FIG. 2. Elements that are essentially the same elements in FIG. 1 have been given the same numbering. It may be envisaged by the skilled person that a combustible heat source (not shown) may be instead be used with the second embodiment in lieu of the electrical heating element, in a configuration similar to the configuration containing combustible heat source 1080 in article 1001 of FIG. 3.

FIG. 5 illustrates a third embodiment of a heated aerosol-generating article 5000. The aerosol-generating substrate 5020 comprises a rod formed from a first sheet of homogenised dill seed material formed of particulate plant material comprising a proportion of dill seed particles, and a second sheet of homogenised tobacco material comprising primarily cast-leaf tobacco.

A suitable homogenised dill seed material for use as the first sheet is shown in Table 1 below as one of Samples A to D. A suitable homogenised tobacco material for use as the second sheet is shown in Table 1 below as Sample E. Sample E comprises only tobacco particles and is included for the purposes of comparison only.

The second sheet overlies the first sheet, and the combined sheets have been crimped, gathered and at least partially wrapped in a filter paper (not shown) to form a plug that is part of the rod. Both sheets include additives, including glycerol as an aerosol former. The article 5000, analogously to the article 1000 in FIG. 1, is particularly suitable for use with the electrically-operated aerosol-generating system 2000 comprising a heater shown in FIG. 2. Elements that are essentially the same elements in FIG. 1 have been given the same numbering. It may be envisaged by the skilled person that a combustible heat source (not shown) may be instead be used with the third embodiment in lieu of the electrical heating element, in a configuration similar to the configuration containing combustible heat source 1080 in article 1001 of FIG. 3.

FIGS. 6a, 6b and 6c are cross sectional views of filter 1050 further comprising an aerosol-modifying element. In FIG. 6a, the filter 1050 further comprises an aerosol-modifying element in the form of a spherical capsule or bead 605.

In the embodiment of FIG. 6a, the capsule or bead 605 is embedded in the filter segment 601 and is surrounded on all sides by the filter material 603. In this embodiment, the capsule comprises an outer shell and an inner core, and the inner core contains a liquid flavourant. The liquid flavourant is for flavouring aerosol during use of the aerosol-generating article provided with the filter. The capsule 605 releases at least a portion of the liquid flavourant when the filter is subjected to external force, for example by squeezing by a consumer. In the embodiment shown, the capsule is generally spherical, with a substantially continuous outer shell containing the liquid flavourant.

In the embodiment of FIG. 6b, the filter segment 601 comprises a plug of filter material 603 and a central flavour-bearing thread 607 that extends axially through the plug of filter material 603 parallel to the longitudinal axis of the filter 1050. The central flavour-bearing thread 607 is of substantially the same length as the plug of filter material 603, so that the ends of the central flavour-bearing thread 607 are visible at the ends of the filter segment 601. In FIG. 6b, filter material 603 is cellulose acetate tow. The central flavour-bearing thread 607 is formed from twisted filter plug wrap and loaded with an aerosol-modifying agent.

In the embodiment of FIG. 6c, the filter segment 601 comprises more than one plug of filter material 603, 603'. Preferably, the plugs of filter material 603, 603' are formed from cellulose acetate, such that they are able to filter the aerosol provided by the aerosol generating article. A wrapper 609 is wrapped around and connects filter plugs 603, 603'. Inside a cavity 611 is a capsule 605 comprising an outer shell and an inner core, and the inner core contains a liquid flavourant. The capsule is otherwise similar to the embodiment of FIG. 6a.

FIG. 7 is a cross sectional view of aerosol-generating substrate 1020 further comprising an elongate susceptor strip 705. The aerosol-generating substrate 1020 comprises a plug 703 formed from a sheet of homogenised dill seed material comprising tobacco particles and dill seed particles. The elongate susceptor strip 705 is embedded within the plug 703 and extends in a longitudinal direction between the upstream and downstream ends of the plug 703. During use, the elongate susceptor strip 705 heats the homogenised dill seed material by means of induction heating, as described above.

EXAMPLE

Different samples of homogenised plant material for use in an aerosol-generating substrate according to the invention, as described above with reference to the figures, may be prepared from aqueous slurries having compositions shown Table 1. Sample A comprises only dill seed particles and no tobacco particles, in accordance with the invention. Samples B to D comprise dill seed particles and tobacco particles, in accordance with the invention. Sample E comprises only tobacco particles and is included for the purposes of comparison only.

Sample A is formed with a CMC binder in combination with cellulose fibres, in accordance with the second preferred embodiment of the invention. Sample A is prepared from an aqueous slurry containing 72.97 kg of water per 100 kg of slurry, with the remainder accounted for by the components in the relative amounts shown in Table 1.

Samples B to E are formed with an amount of dill seed particles below 25 percent by weight, and a guar gum binder, in accordance with the first preferred embodiment of the invention. Samples B to D are prepared from an aqueous slurry containing between 78-79 kg of water per 100 kg of slurry.

In the table below, % DWB refers to the "dry weight base," in this case, the percent by weight calculated relative to the dry weight of the homogenised plant material. The dill seed powder may be formed from dried dill seeds, which may be ground to a final D95=777.1 microns by triple impact milling.

The slurries may be casted using a casting bar (0.6 mm) on a glass plate, dried in an oven at 140 degrees Celsius for 7 minutes, and then dried in a second oven at 120 degrees Celsius for 30 seconds.

TABLE 1

Dry content of slurries

| Sample | Dill seed (% DWB) | Tobacco (% DWB) | Glycerol (% DWB) | Guar Gum (% DWB) | CMC (% DWB) | Cellulose fibers (% DWB) |
|---|---|---|---|---|---|---|
| A | 15 | 60 | 16.7 | 0 | 4.6 | 3.7 |
| B | 15 | 60 | 18 | 3 | 0 | 4 |
| C | 7.5 | 67.5 | 18 | 3 | 0 | 4 |
| D | 2.5 | 72.5 | 18 | 3 | 0 | 4 |
| E | 0 | 75 | 18 | 3 | 0 | 4 |

For each of the samples A to E of homogenised plant material, a plug may be produced from a single continuous sheet of the homogenised plant material, the sheets each having widths of between 100 mm to 130 mm. The individual sheets preferably have a thickness of about 220 microns and a grammage of about 197 g/m$^2$. The cut width of each sheet is about 131 mm. The sheets may be crimped to a height of 165 microns to 170 microns, and rolled into plugs having a length of about 12 mm and diameters of about 7 mm, circumscribed by a paper wrapper. The weight of homogenised plant material in each plug is about 310 mg and the total weight of each plug is about 323.6 mg.

For each of the plugs, an aerosol-generating article having an overall length of about 45 mm may be formed having a structure as shown in FIG. 3 comprising, from the downstream end: a mouth end cellulose acetate filter (about 7 mm long), an aerosol spacer comprising a crimped sheet of polylactic acid polymer (about 18 mm long), a hollow acetate tube (about 8 mm long) and the plug of aerosol-generating substrate.

For Sample B of homogenised plant material, for which dill seed particles make up 20 percent of the particulate plant material, the characteristic compounds were extracted from the plug of homogenised plant material using methanol as detailed above. The extract was analysed as described above to confirm the presence of the characteristic compounds and to measure the amounts of the characteristic compounds. The results of this analysis are shown below in Table 2, wherein the amounts indicated correspond to the amount per aerosol-generating article, wherein the aerosol-generating substrate of the aerosol-generating article contained 310 mg of the Sample B of homogenised plant material.

For the purposes of comparison, the amounts of the characteristic compounds present in the particulate plant material (dill seed particles) used to form Sample B are also shown. For the particulate material, the amounts indicated correspond to the amount of the characteristic compound in a sample of particulate plant material having a weight corresponding to the total weight of the particulate plant material in the aerosol-generating article containing 310 mg of Sample B.

TABLE 2

Amount of dill seed-specific compounds in the particulate plant material and in the aerosol-generating substrate

| Characteristic Compound | Amount in the particulate plant material (micrograms per article) | Amount in the aerosol-generating substrate (micrograms per article) |
| --- | --- | --- |
| Carvone | 39.4 | 6.7 |
| Limonene | 956.9 | 230.1 |

For each of the other samples comprising a proportion of dill seed particles, the amount of the characteristic compounds can be estimated based on the values in Table 2 by assuming that the amount is present in proportion to the weight of the dill seed particles.

Mainstream aerosols of the aerosol-generating articles incorporating aerosol-generating substrates formed from Samples A to E of homogenised plant material may be generated in accordance with Test Method A, as defined above. For each sample, the aerosol that is produced may be trapped and analysed.

As described in detail above, according to Test Method A, the aerosol-generating articles may be tested using the commercially available IQOS® heat-not-burn device tobacco heating system 2.2 holder (THS2.2 holder) from Philip Morris Products SA. The aerosol-generating articles are heated under a Health Canada machine-smoking regimen over 30 puffs with a puff volume of 55 ml, puff duration of 2 seconds and a puff interval of 30 seconds (as described in ISO/TR 19478-1:2014).

The aerosol generated during the smoking test is collected on a Cambridge filter pad and extracted with a liquid solvent. FIG. 10 shows suitable apparatus for generating and collecting the aerosol from the aerosol-generating articles.

Aerosol-generating device 111 shown in FIG. 10 is a commercially available tobacco heating device (IQOS). The contents of the mainstream aerosol generated during the Health Canada smoking test as detailed above are collected in aerosol collection chamber 113 on aerosol collection line 120. Glass fiber filter pad 140 is a 44 mm Cambridge glass fiber filter pad (CFP) in accordance with ISO 4387 and ISO 3308.

For LC-HRAM-MS Analysis:

Extraction solvent 170, 170a, which in this case is methanol and internal standard (ISTD) solution, is present at a volume of 10 mL in each micro-impinger 160, 160a. The cold baths 161, 161a each contain a dry ice-isopropyl ether to maintain the micro-impingers 160, 160a each at approximately −60° C. The gas-vapour phase is trapped in the extraction solvent 170, 170a as the aerosol bubbles through micro-impingers 160, 160a. The combined solutions from the two micro-impingers are isolated as impinger-trapped gas-vapor phase solution 180 in step 181.

The CFP and the impinger-trapped gas-vapor phase solution 180 are combined in a clean Pyrex® tube in step 190. In step 200, the total particulate matter is extracted from the CFP using the impinger-trapped gas-vapor phase solution 180 (which contains methanol as a solvent) by thoroughly shaking (disintegrating the CFP), vortexing for 5 min and finally centrifuging (4500 g, 5 min, 10° C.). Aliquots (300 μL) of the reconstituted whole aerosol extract 220 were transferred into a silanized chromatographic vial and diluted with methanol (700 μL), since the extraction solvent 170, 170a already comprised internal standard (ISTD) solution. The vials were closed and mixed for 5 minutes using an Eppendorf ThermoMixer (5° C.; 2000 rpm).

Aliquots (1.5 μL) of the diluted extracts were injected and analyzed by LC-HRAM-MS in both full scan mode and data-dependent fragmentation mode for compound identification.

For GCxGC-TOFMS Analysis:

As discussed above, when samples for GCxGC-TOFMS experiments are prepared, different solvents are suitable for extracting and analysing polar compounds, non-polar compounds and volatile compounds separated from whole aerosol. The experimental set-up is identical to that described with respect to sample collection for LC-HRAM-MS, with the exceptions indicated below.

Nonpolar & Polar

Extraction solvent 171, 171a, is present at a volume of 10 mL and is an 80:20 v/v mixture of dichlormethane and methanol, also containing retention-index marker (RIM) compounds and stable isotopically labeled internal standards (ISTD). The cold baths 162, 162a each contain a dry ice-isopropanol mixture to maintain the micro-impingers 160, 160a each at approximately −78° C. The gas-vapor phase is trapped in the extraction solvent 171, 171a as the aerosol bubbles through micro-impingers 160, 160a. The combined solutions from the two micro-impingers are isolated as impinger-trapped gas-vapor phase solution 210 in step 182.

Nonpolar

The CFP and the impinger-trapped gas-vapor phase solution 210 are combined in a clean Pyrex® tube in step 190. In step 200, the total particulate matter is extracted from the CFP using the impinger-trapped gas-vapor phase solution 210 (which contains dichloromethane and methanol as a solvent) by thoroughly shaking (disintegrating the CFP), vortexing for 5 min and finally centrifuging (4500 g, 5 min, 10° C.) to isolate the polar and non-polar components of the whole aerosol extract 230.

In step 250, an 10 mL aliquot 240 of the whole aerosol extract 230 was taken. In step 260, a 10 mL aliquot of water is added, and the entire sample is shaken and centrifuged. The non-polar fraction 270 was separated, dried with sodium sulfate and analysed by GCxGC-TOFMS in full scan mode.

Polar

ISTD and RIM compounds were added to polar fraction 280, which was then directly analysed by GCxGC-TOFMS in full scan mode.

Each smoking replicate (n=3) comprises the accumulated trapped and reconstituted non-polar fraction 270 and polar fraction 280 for each sample Volatile Components Whole aerosol was trapped using two micro-impingers 160, 160a in series. Extraction solvent 172, 172a, which in this case is N,N-dimethylformamide (DMF) containing retention-index marker (RIM) compounds and stable isotopically labeled internal standards (ISTD), is present at a volume of 10 mL in each micro-impinger 160, 160a. The cold baths 161, 161a each contain a dry ice-isopropyl ether to maintain the micro-impingers 160, 160a each at approximately −60° C. The gas-vapor phase is trapped in the extraction solvent 170, 170a as the aerosol bubbles through micro-impingers 160, 160a. The combined solutions from the two micro-impingers are isolated as a volatile-containing phase 211 in step 183. The volatile-containing phase 211 is analysed separately from the other phases and injected directly into the GCxGC-TOFMS using cool-on-column injection without further preparation.

Table 3 below shows the levels of the characteristic compounds from the dill seed particles in the aerosol generated from an aerosol-generating article incorporating Sample B of homogenised plant material, including 15 percent by weight of dill seed particles. For the purposes of comparison, Table 3 also shows the levels of the characteristic compounds in the aerosol generated from an aerosol-generating article incorporating Sample E of homogenised plant material, including tobacco particles only (and therefore not in accordance with the invention).

TABLE 3

Content of characteristic compounds in aerosol

| Compound | Sample B (micrograms per article) | Sample B (micrograms per gram) | Sample B (micrograms per 55 ml puff) | Sample E (micrograms per article) |
|---|---|---|---|---|
| Carvone | 9.2 | 29.7 | 0.8 | 2.9 |
| Limonene | 69.9 | 225.5 | 5.8 | 0 |

In the aerosol generated from Sample B, relatively high levels of the characteristic compounds were measured. The ratio of carvone to limonene was less than 10. The levels of the characteristic compounds were therefore indicative of the presence of dill seed particles in the sample. In contrast, for the tobacco only Sample E, which contained substantially no dill seed particles, the levels of the characteristic compounds were found to be at or close to zero.

For each of the other samples B to D comprising a proportion of dill seed particles, the amount of the characteristic compounds in the aerosol can be estimated based on the values in Table 3 by assuming that the amount is present in proportion to the weight of the dill seed particles in the aerosol-generating substrate from which the aerosol is generated.

Table 4 below compares the levels of certain aerosol constituents in the aerosol generated from an aerosol-generating article incorporating sample A (20:80 ratio of dill seed to tobacco) with the aerosol generated from the tobacco only Sample E. The reduction indicated is the percentage reduction provided by replacing 20 percent of the tobacco particles in the homogenised material of Sample E with dill seed particles.

TABLE 4

Composition of aerosol

| Aerosol Constituent | Sample E (100% tobacco) | Sample A (20% dill seed) | Reduction (%) |
|---|---|---|---|
| Formaldehyde (µg/article) | 4.47 | 2.74 | 38.7 |
| Benzo[a]pyrene (µg/article) | 1.00 | 0.60 | 39.85 |
| Benz[a]anthracene (µg/article) | 1.95 | 1.25 | 36.04 |
| Dibenz[a,h]anthracene (µg/article) | 0.13 | 0.04 | 69.71 |
| Phenol (µg/article) | 1.53 | 0.97 | 36.5 |
| Resorcinol (µg/article) | 0.04 | 0.025 | 38.3 |

As shown in Table 4, the aerosol produced from Sample A containing 20 percent by weight dill seed particles based on the dry weight of the particulate plant material results in a reduced level of formaldehyde when compared to the level of formaldehyde in the aerosol produced from Sample E containing 100 percent by weight tobacco based on the dry weight of the particulate plant material. Furthermore, the aerosol produced from Sample A results in reduced levels of several polycyclic aromatic hydrocarbons (PAHs): benzo[a]pyrene, benz[a]anthracene and dibenz[a,h]anthracene pyrene when compared to the aerosol produced from Sample E. Furthermore, the aerosol produced from Sample A results in reduced levels of several phenolic compounds, including phenol and resorcinol.

In most cases, the reduction provided in the level of these undesirable aerosol compounds is significantly greater than the proportional reduction that would be expected as a result of the substitution of 20 percent of tobacco particles for dill seed particles. The inclusion of the dill seed particles in combination with the tobacco particles is therefore providing an unexpectedly high reduction in the levels of these compounds. The inclusion of dill seed particles can therefore provide an aerosol that has improved sensory attributes whilst reducing the levels of certain undesirable compounds in the aerosol.

The invention claimed is:

1. An aerosol-generating article, comprising:
an aerosol-generating substrate comprising
a homogenised dill seed material comprising dill seed particles, an aerosol former, and a binder, at least 100 micrograms of carvone per gram of the aerosol-generating substrate, on a dry weight basis, and at least 2 micrograms of limonene per gram of the aerosol-generating substrate, on a dry weight basis, wherein an amount of carvone per gram of the aerosol-generating substrate is no more than 50 times an amount of limonene per gram of the aerosol-generating substrate.

2. The aerosol-generating article according to claim 1, wherein the aerosol-generating substrate further comprises between 1 milligram and 20 milligrams of nicotine per gram of the aerosol-generating substrate, on a dry weight basis.

3. The aerosol-generating article according to claim 1, wherein the homogenised dill seed material further comprises between 5 percent by weight and 55 percent by weight of the aerosol former and between 1 percent by weight and 10 percent by weight of the binder, on a dry weight basis.

4. The aerosol-generating article according to claim 1, wherein the binder comprises guar gum.

5. The aerosol-generating article according to claim 1, wherein the binder comprises cellulose ether.

6. The aerosol-generating article according to claim 5,
wherein the aerosol-generating substrate further comprises additional cellulose that is not derived from the dill seed particles, and
wherein the additional cellulose comprises at least one of cellulose powder and cellulose fibres.

7. The aerosol-generating article according to claim 1, wherein the homogenised dill seed material further comprises at least 2.5 percent by weight of the dill seed particles, on a dry weight basis.

8. The aerosol-generating article according to claim 1,
wherein the homogenised dill seed material further comprises tobacco particles, and
wherein a weight ratio of the dill seed particles to tobacco particles is no more than 1:4.

9. The aerosol-generating article according to claim 1, wherein the homogenised dill seed material in the aerosol-generating substrate is in a form of cast leaf.

10. The aerosol-generating article according to claim 1, wherein the homogenised dill seed material is in a form of dill seed paper.

11. The aerosol-generating article according to claim 1,
wherein upon heating of the aerosol-generating substrate according to Test Method A, aerosol generated from the aerosol-generating substrate comprises:
at least 20 micrograms of carvone per gram of the aerosol-generating substrate, on a dry weight basis, and
at least 2 micrograms of limonene per gram of the aerosol-generating substrate, on a dry weight basis,
wherein an amount of carvone in the aerosol per gram of the substrate is no more than 10 times an amount of limonene in the aerosol per gram of the substrate.

12. The aerosol-generating article according to claim 1,
wherein upon heating of the aerosol-generating substrate according to Test Method A, aerosol generated from the aerosol-generating substrate comprises:
carvone in an amount of at least 0.5 micrograms per puff of aerosol, and
limonene in an amount of at least 0.05 micrograms per puff of aerosol,
wherein a puff of the aerosol has a volume of 55 millilitres as generated by a smoking machine, and
wherein an amount of carvone per puff of aerosol is no more than 10 times an amount of limonene per puff of aerosol.

13. An aerosol-generating system, comprising:
an aerosol-generating device comprising a heating element; and
an aerosol-generating article according to claim 1.

14. An aerosol-generating substrate, comprising:
a homogenised dill seed material comprising dill seed particles, aerosol former, and binder;
at least 100 micrograms of carvone per gram of the aerosol-generating substrate, on a dry weight basis; and
at least 2 micrograms of limonene per gram of the aerosol-generating substrate, on a dry weight basis,
wherein an amount of carvone per gram of the aerosol-generating substrate is no more than 50 times an amount of limonene per gram of the aerosol-generating substrate.

15. An aerosol produced upon heating of an aerosol-generating substrate according to claim 14, the aerosol comprising:
carvone in an amount of at least 0.5 micrograms per puff of the aerosol; and
limonene in an amount of at least 0.05 micrograms per puff of the aerosol,
wherein a puff of the aerosol has a volume of 55 millilitres as generated by a smoking machine, and
wherein an amount of carvone in the aerosol per gram of the aerosol-generating substrate is no more than 10 times an amount of limonene in the aerosol per gram of the aerosol-generating substrate.

* * * * *